(12) United States Patent
Choi et al.

(10) Patent No.: US 11,818,399 B2
(45) Date of Patent: Nov. 14, 2023

(54) TECHNIQUES FOR SIGNALING NEURAL NETWORK TOPOLOGY AND PARAMETERS IN THE CODED VIDEO STREAM

(71) Applicant: TENCENT AMERICA LLC, Palo Alto, CA (US)

(72) Inventors: Byeongdoo Choi, Palo Alto, CA (US); Zeqiang Li, Palo Alto, CA (US); Wei Jiang, Sunnyvale, CA (US); Wei Wang, Palo Alto, CA (US); Xiaozhong Xu, State College, PA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 94 days.

(21) Appl. No.: 17/476,824

(22) Filed: Sep. 16, 2021

(65) Prior Publication Data

US 2022/0217403 A1    Jul. 7, 2022

Related U.S. Application Data

(60) Provisional application No. 63/133,682, filed on Jan. 4, 2021.

(51) Int. Cl.
*H04N 19/70* (2014.01)
*H04N 19/42* (2014.01)
*H04N 19/184* (2014.01)
*G06N 3/04* (2023.01)

(52) U.S. Cl.
CPC ............... *H04N 19/70* (2014.11); *G06N 3/04* (2013.01); *H04N 19/184* (2014.11); *H04N 19/42* (2014.11)

(58) Field of Classification Search
CPC ...... H04N 19/70; H04N 19/184; H04N 19/42; G06N 3/04
See application file for complete search history.

(56) References Cited

U.S. PATENT DOCUMENTS

| 11,563,681 | B2* | 1/2023 | Sivasubramanian ... H04L 67/10 |
| 2004/0103179 | A1* | 5/2004 | Damm .................... H04L 43/50 |
| | | | 709/223 |
| 2020/0175396 | A1 | 6/2020 | Boyce |
| 2020/0184603 | A1 | 6/2020 | Mukherjee et al. |
| 2020/0304836 | A1 | 9/2020 | Li et al. |

FOREIGN PATENT DOCUMENTS

WO    2020/190696 A1    9/2020

OTHER PUBLICATIONS

Communication from European Patent Office dated Jan. 11, 2023 in European Application No. 21899322.8.

(Continued)

*Primary Examiner* — Jae N Noh
(74) *Attorney, Agent, or Firm* — Sughrue Mion, PLLC

(57) ABSTRACT

There is included a method and apparatus comprising computer code configured to cause a processor or processors to perform obtaining a video bitstream, coding the video bitstream at least partly by a neural network, determining topology information and parameters of the neural network, signaling the determined topology information and the parameters of the neural network in a plurality of syntax elements associated with the coded video bitstream.

20 Claims, 18 Drawing Sheets

(56) References Cited

OTHER PUBLICATIONS

Extended European Search Report dated Dec. 22, 2022 in European Application No. 21899322.8.
Hamed R. Tavakoli et al., "[NNR] Extensions to the high-level syntax for support of ONNX format", ISO/IEC JTC1/SC29/WG11 Coding of moving pictures and audio, m53720, Apr. 2020, 3 pgs.
Choi B et al., "AHG9/AHG11: SEI message for carriage of neural network information for post filtering", Joint Video Experts Team (JVET) of ITU-T SG 16 WP 3 and ISO/IEC JTC 1/SC 29, JVET-U0091, 21st Meeting, by teleconference, Jan. 6-15, 2021, 3 pgs.
Choi B et al., "AHG9/AHG11: SEI message for carriage of neural network information for post filtering", Joint Video Experts Team (JVET) of ITU-T SG 16 WP 3 and ISO/IEC JTC 1/SC 29, JVET-V0091-v2, 22nd meeting, by teleconference, Apr. 20-28, 2021, 15 pgs.
T. Berners-Lee et al., "Uniform Resource Identifier (URI): Generic Syntax", Network Working Group Request for Comments: 3986, Jan. 2005, pp. 1-61.
P. Deutsch et al., "ZLIB Compressed Data Format Specification version 3.3", Network Working Group Request for Comments: 1950, May 1996, pp. 1-11.
Benjamin Bross et al., "Versatile Video Coding (Draft 10)", Joint Video Experts Team (JVET) of ITU-T SG 16 WP 3 and ISO/IEC JTC 1/SC 29/WG 11, JVET-S2001-vD, 19th Meeting: by teleconference, Jun. 22-Jul. 1, 2020, 551 pages.
International Search Report dated Jan. 11, 2022 in Application No. PCT/US21/53951.
Written Opinion of the International Searching Authority dated Jan. 11, 2022 in Application No. PCT/US21/53951.

\* cited by examiner

TECHNIQUES FOR SIGNALING NEURAL NETWORK TOPOLOGY AND PARAMETERS IN THE CODED VIDEO STREAM

CROSS REFERENCE TO RELATED APPLICATION

The present application claims priority to provisional application U.S. 63/133,682 filed on Jan. 4, 2021 which is hereby expressly incorporated by reference, in its entirety, into the present application.

BACKGROUND

1. Field

The present disclosure relates to video coding technologies such as those involving supplemental enhancement information (SEI) used with neural network involved video coding.

2. Description of Related Art

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as the Joint Video Expert Team. The Audio Video coding Standard (AVS) of China is also in progress.

Involving a neural network, due to at least the complexity of neural network based coding, in such coding a normal codec may not be able to do a filtering process therewith. As such, there are technical deficiencies including lack of compressibility, accuracy, and otherwise unnecessary discarding of information related to neural networks.

SUMMARY

According to exemplary embodiments, there is included a method and apparatus comprising memory configured to store computer program code and a processor or processors configured to access the computer program code and operate as instructed by the computer program code. The computer program code includes obtaining code configured to cause the at least one processor to obtain a video bitstream, coding code configured to cause the at least one processor to code the video bitstream at least partly by a neural network, determining code configured to cause the at least one processor to determine topology information and parameters of the neural network, and signaling code configured to cause the at least one processor to signal the determined topology information and the parameters of the neural network in a plurality of syntax elements associated with the coded video bitstream.

According to exemplary embodiments, the plurality of syntax elements are signaled via one or more of a supplemental enhancement information (SEI) message, a parameter set, and a meta-data container box. Further according to exemplary embodiments, the neural network comprises a plurality of operation nodes, coding the video bitstream by the neural network comprises: feeding input tensor data of the video bitstream into a first operation node of the operation nodes, processing the input tensor data with any of pre-trained constants and variables, and outputting intermediate tensor data, wherein the intermediate tensor data comprises a weighted summation of the input tensor data and any of trained constants and updated variables. Further according to exemplary embodiments, the topology information and parameters are based on said coding of the video bitstream by the neural network.

According to exemplary embodiments, signaling the determined topology information and the parameters comprises providing external linkage information at which the determined topology information and the parameters are stored. Further according to exemplary embodiments, the neural network comprises a plurality of operation nodes, coding the video bitstream by the neural network comprises: feeding input tensor data of the video bitstream into a first operation node of the operation nodes, processing the input tensor data with any of pre-trained constants and variables, and outputting intermediate tensor data, wherein the intermediate tensor data comprises a weighted summation of the input tensor data and any of trained constants and updated variables. Further according to exemplary embodiments, the topology information and parameters are based on said coding of the video bitstream by the neural network.

According to exemplary embodiments, signaling the determined topology information and the parameters comprises explicitly signaling the determined topology information and the parameters by at least one of a neural network exchange format (NNEF), an open neural network exchange (ONNX) format, and an MPEG neural network compression standard (NNR) format. Further according to exemplary embodiments, the neural network comprises a plurality of operation nodes, coding the video bitstream by the neural network comprises: feeding input tensor data of the video bitstream into a first operation node of the operation nodes, processing the input tensor data with any of pre-trained constants and variables, and outputting intermediate tensor data, wherein the intermediate tensor data comprises a weighted summation of the input tensor data and any of trained constants and updated variables. Further according to exemplary embodiments, the topology information and parameters are based on said coding of the video bitstream by the neural network. Further according to exemplary embodiments the at least one of the neural network exchange format (NNEF), the open neural network exchange (ONNX) format, and the MPEG neural network compression standard (NNR) format is the MPEG NNR format, and at least one of the parameters are compressed into at least one of a supplemental enhancement information (SEI) message and a data file.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
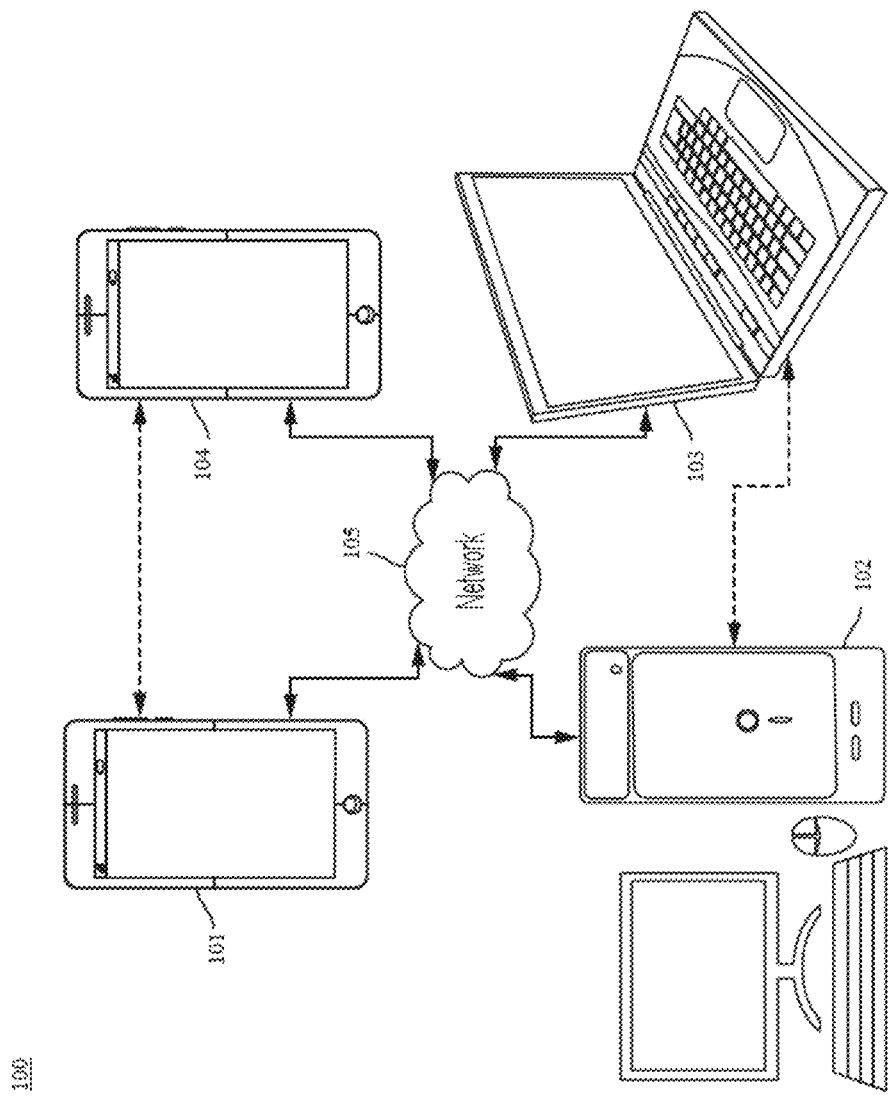
FIG. 1 is a simplified illustration of a schematic diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
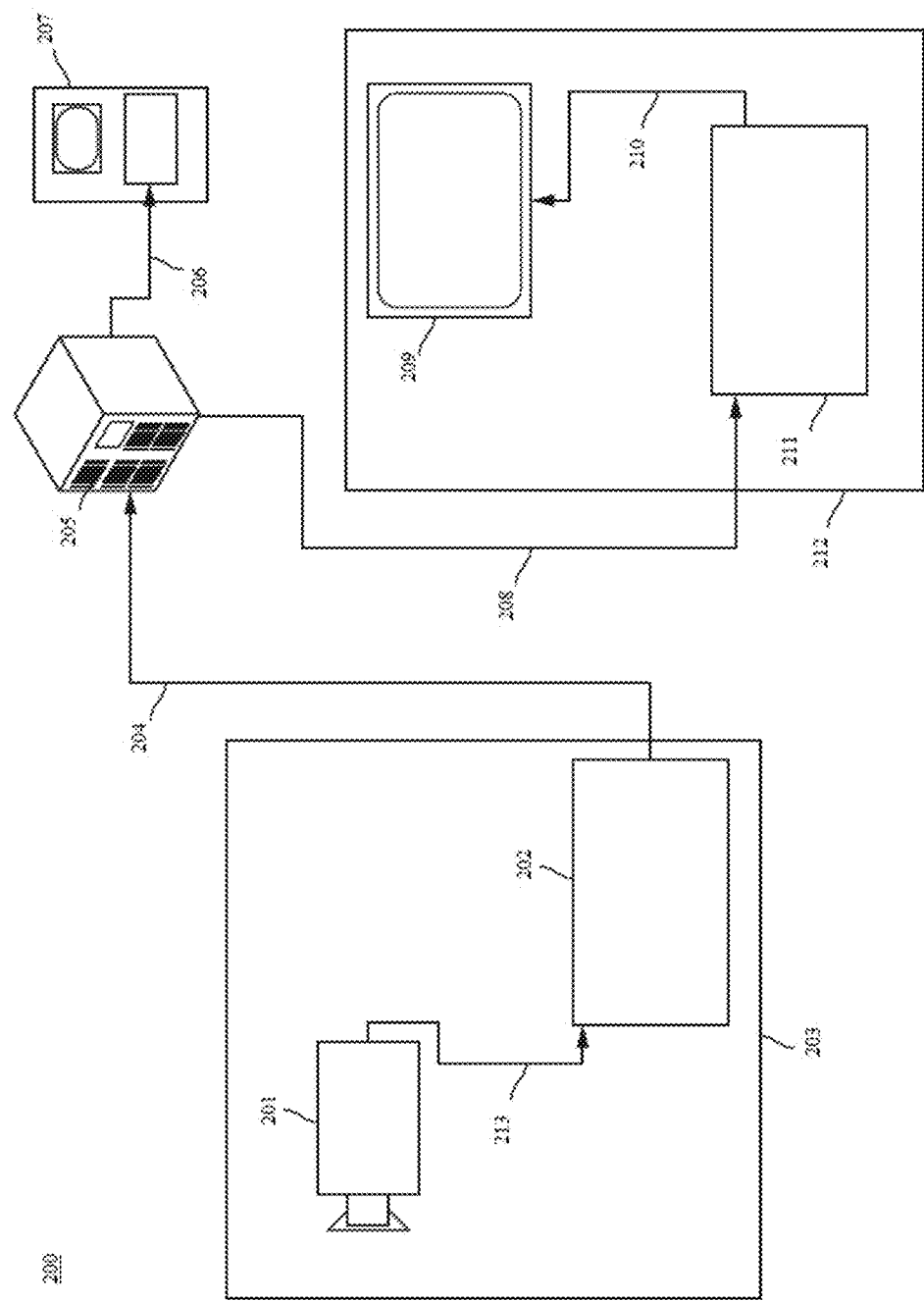
FIG. 2 is a simplified illustration of a schematic diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
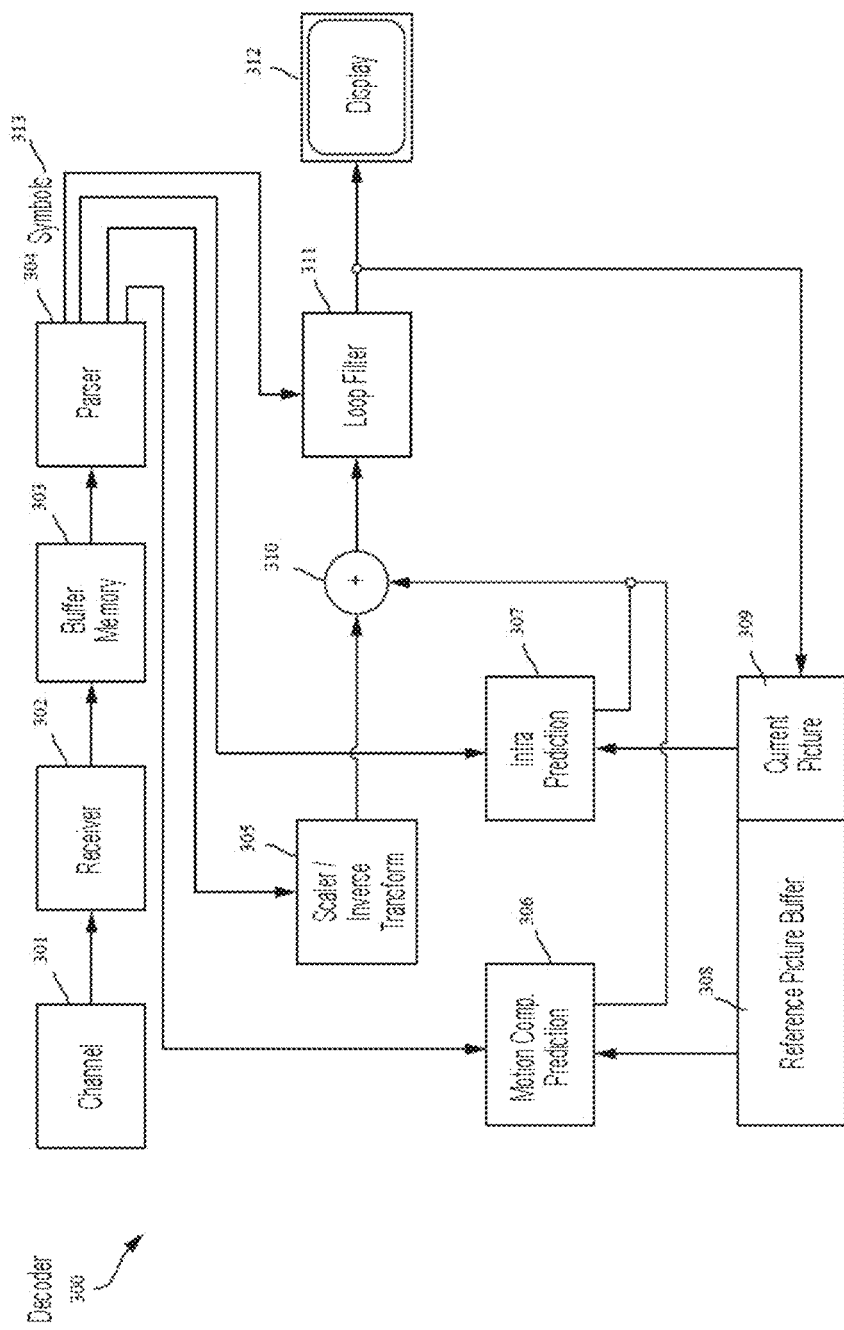
FIG. 3 is a simplified illustration of a schematic diagram in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
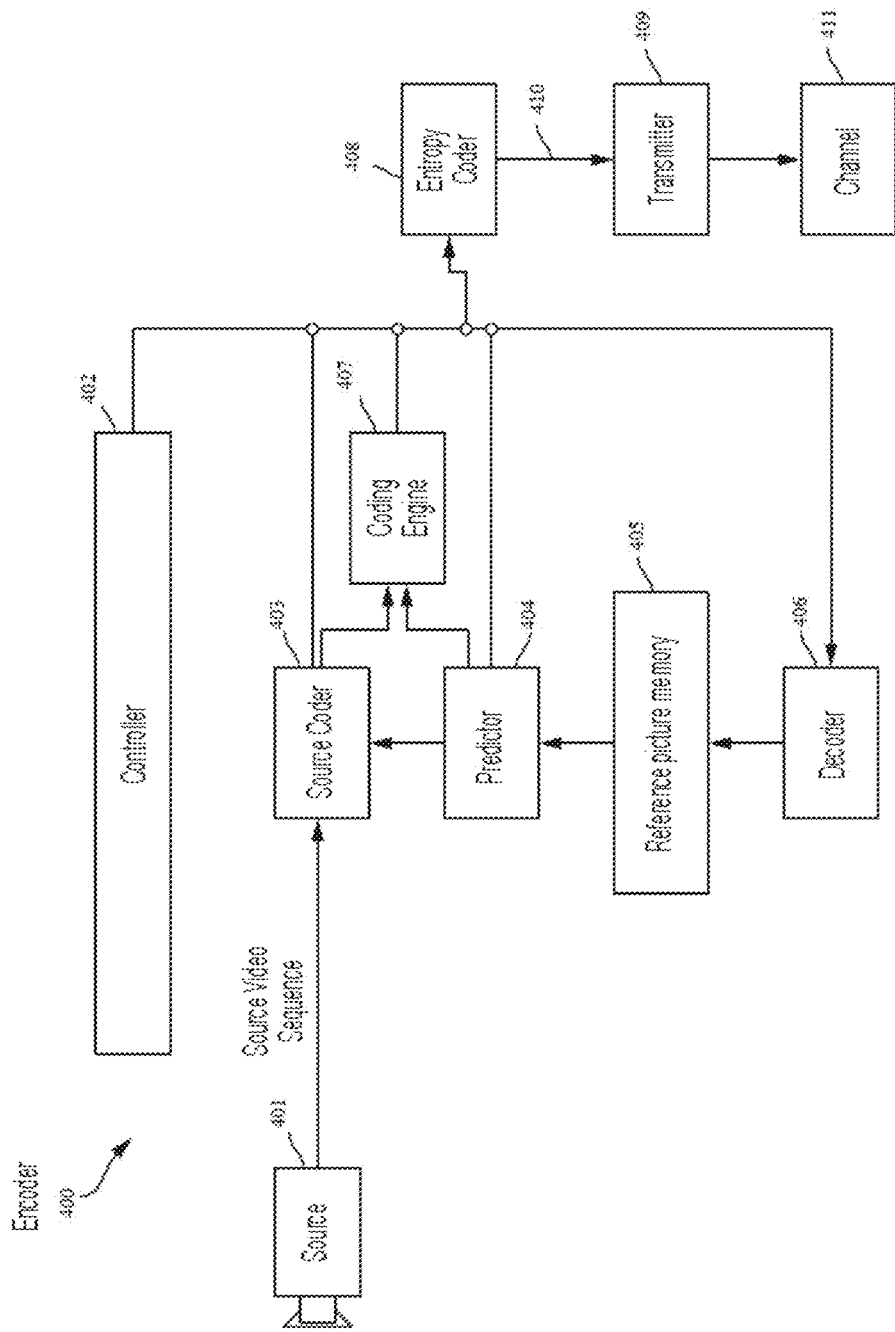
FIG. 4 is a simplified illustration of a schematic diagram in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
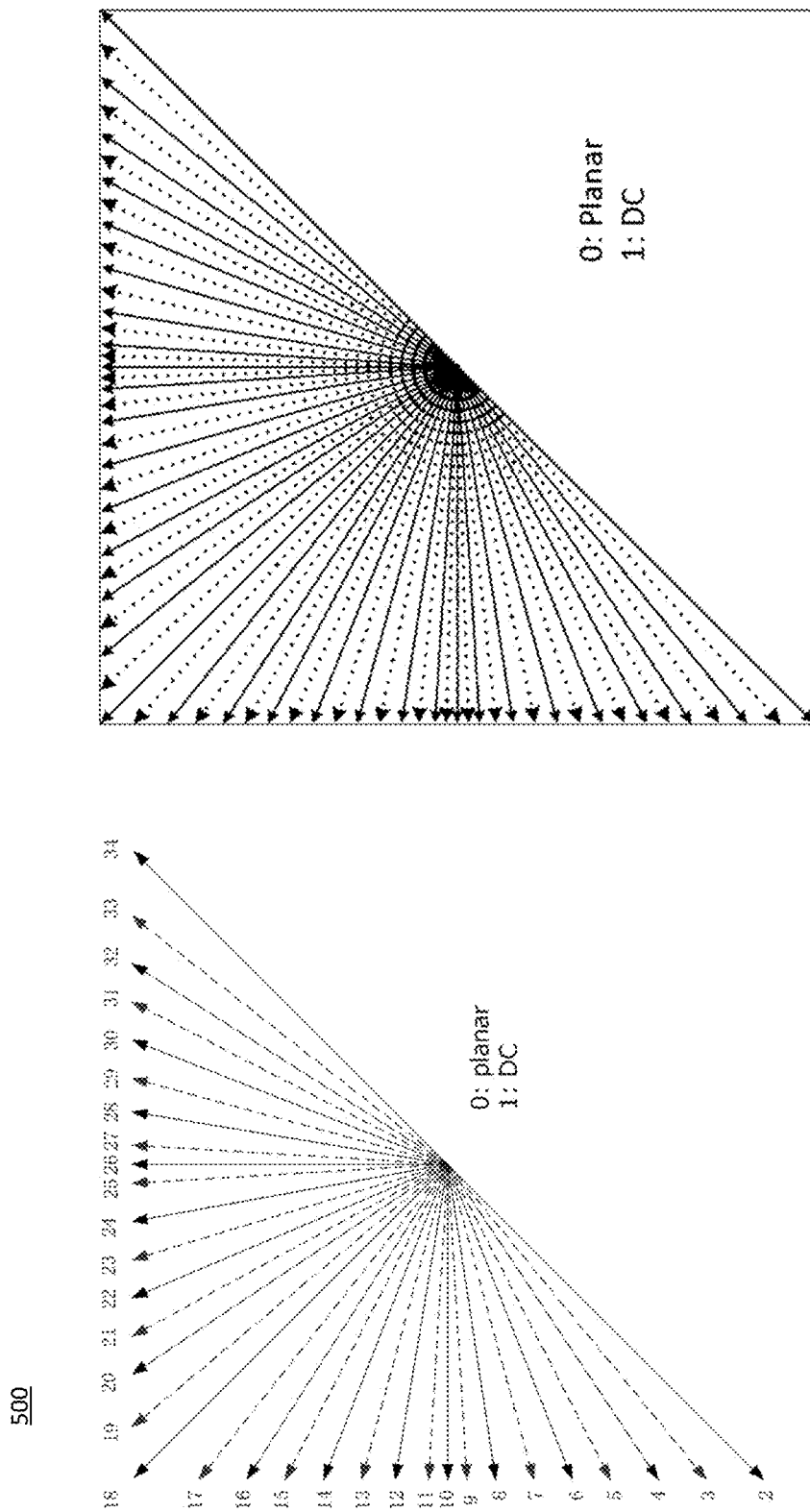
FIG. 5 is a simplified illustration of a diagram in accordance with embodiments.

FIG. 5 illustrates intra prediction modes used in HEVC and JEM. To capture the arbitrary edge directions presented in natural video, the number of directional intra modes is extended from 33, as used in HEVC, to 65. The additional directional modes in JEM on top of HEVC are depicted as dotted arrows in FIG. 1 (*b*), and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an most probable mode (MPM) list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
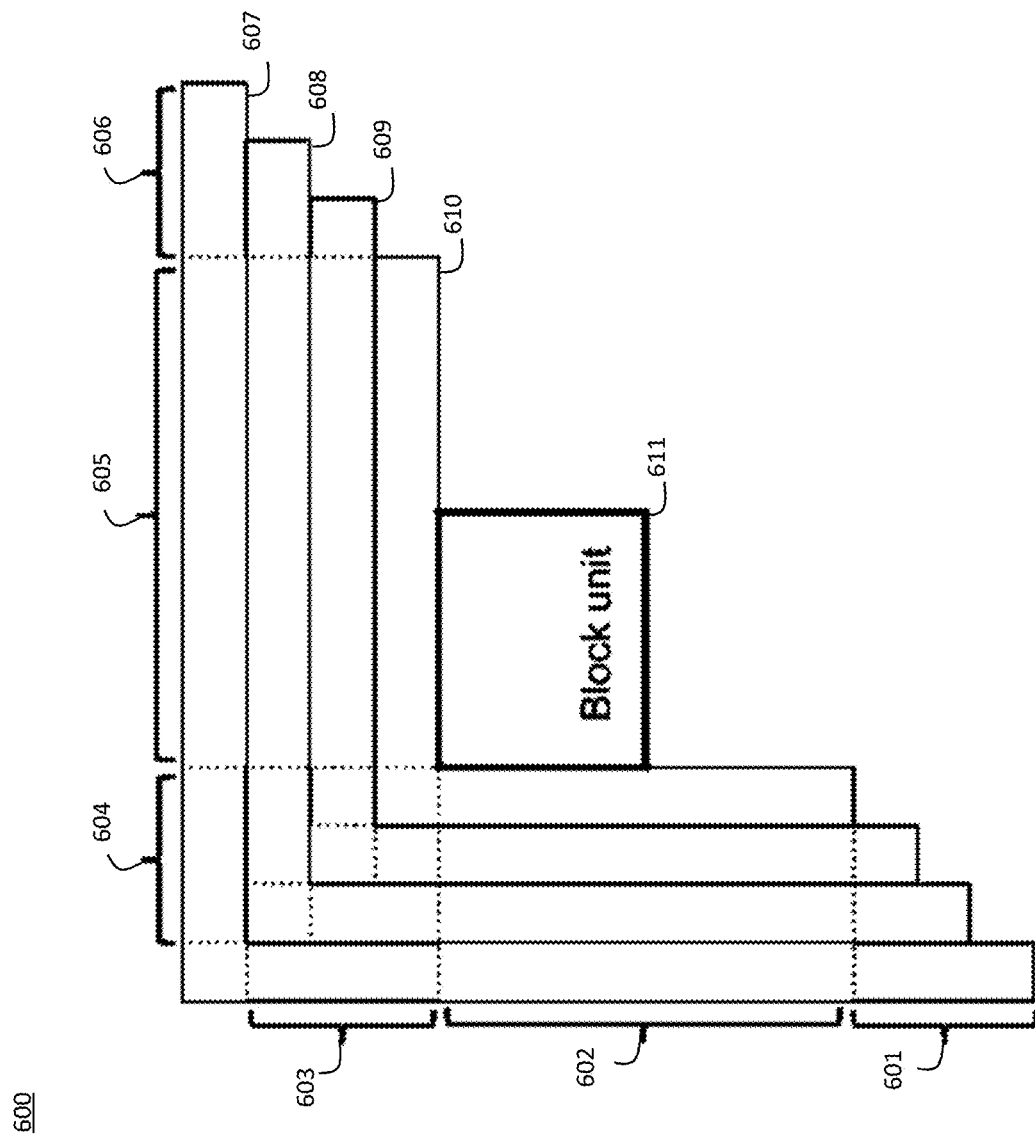
FIG. 6 is a simplified illustration of a diagram in accordance with embodiments.

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 609, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y) is generated from one of the reference samples S1, S2, . . . , and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x, y) is calculated as follows:

$$\text{pred}[x][y]=(wL*R_{-1,y}+wT*R_{x,-1}+wTL*R_{-1,-1}+(64-wL-wT-wTL)*\text{pred}[x][y]+32)>>6 \quad \text{(Eq. 2-1)}$$

where $R_{x,-1}$, $R_{-1,y}$ represent the unfiltered reference samples located at top and left of current sample (x, y), respectively, and $R_{-1,-1}$ represents the unfiltered reference sample located at the top-left corner of the current block. The weightings are calculated as below, $$wT=32>>((y<<1)>>\text{shift}) \quad \text{(Eq. 2-2)}$$

$$wL=32>>((x<<1)>>\text{shift}) \quad \text{(Eq. 2-3)}$$

$$wTL=-(wL>>4)-(wT>>4) \quad \text{(Eq. 2-4)}$$

$$\text{shift}=(\log 2(\text{width})+\log 2(\text{height})+2)>>2 \quad \text{(Eq. 2-5)}.$$

Figure 7:
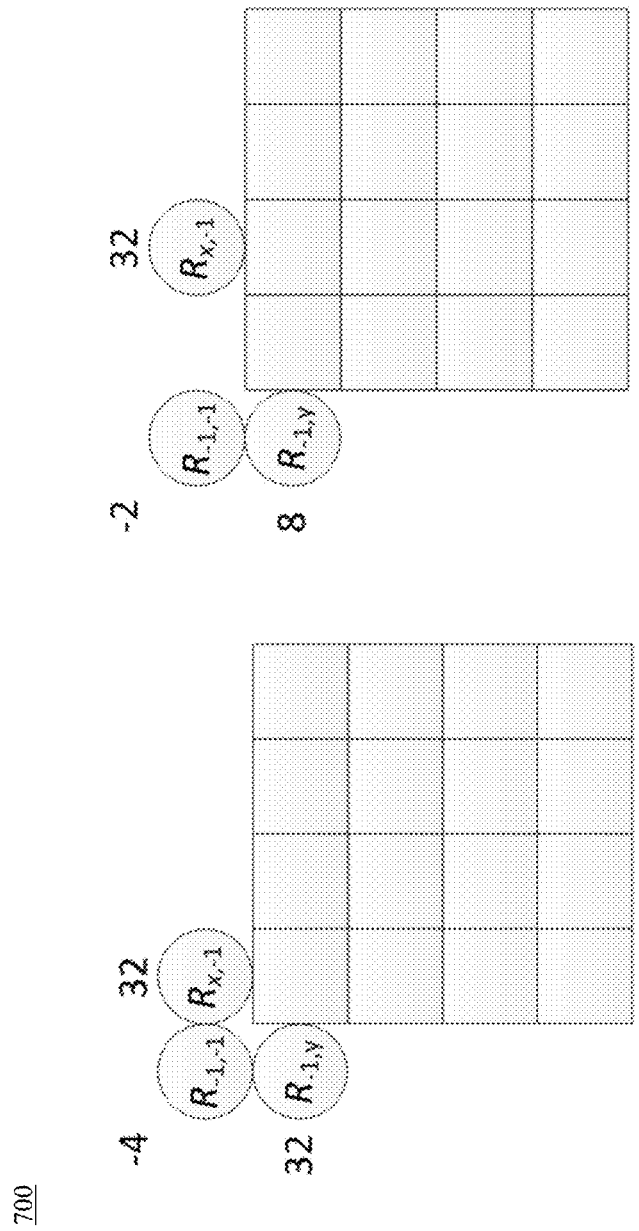
FIG. 7 is a simplified illustration of a diagram in accordance with embodiments.

FIG. 7 illustrates a diagram 700 in which DC mode PDPC weights (wL, wT, wTL) for (0, 0) and (1, 0) positions inside one 4×4 block. If PDPC is applied to DC, planar, horizontal, and vertical intra modes, additional boundary filters are not needed, such as the HEVC DC mode boundary filter or horizontal/vertical mode edge filters. FIG. 7 illustrates the definition of reference samples Rx,−1, R−1,y and R−1,−1 for PDPC applied to the top-right diagonal mode. The prediction sample pred(x', y') is located at (x', y') within the prediction block. The coordinate x of the reference sample Rx,−1 is given by: x=x'+y'+1, and the coordinate y of the reference sample R−1,y is similarly given by: y=x'+y'+1.

Figure 8:
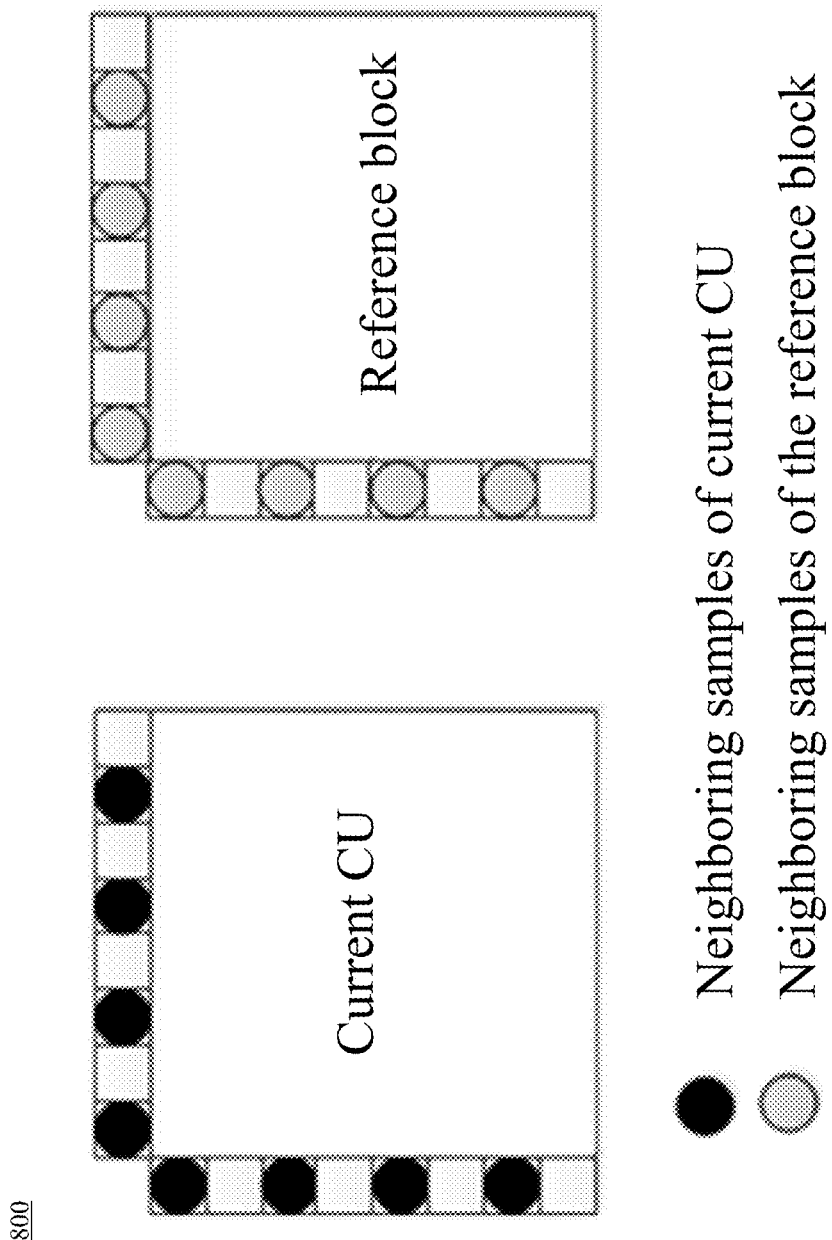
FIG. 8 is a simplified illustration of a diagram in accordance with embodiments.

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

Figure 9B:
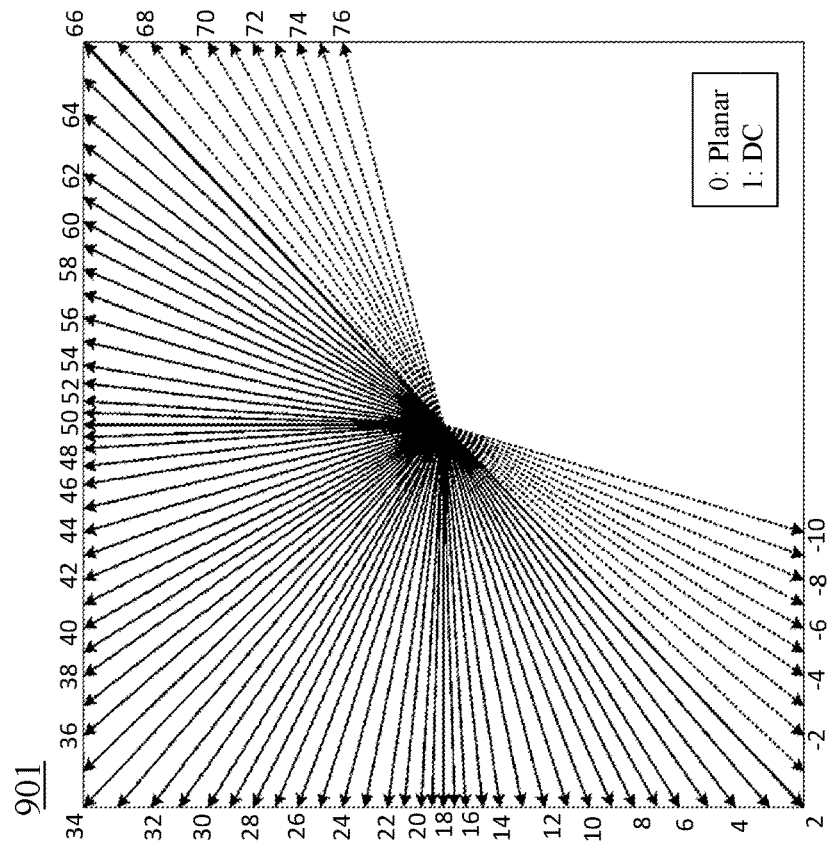
FIG. 9B is a simplified illustration of a diagram in accordance with embodiments.
Figure 9A:
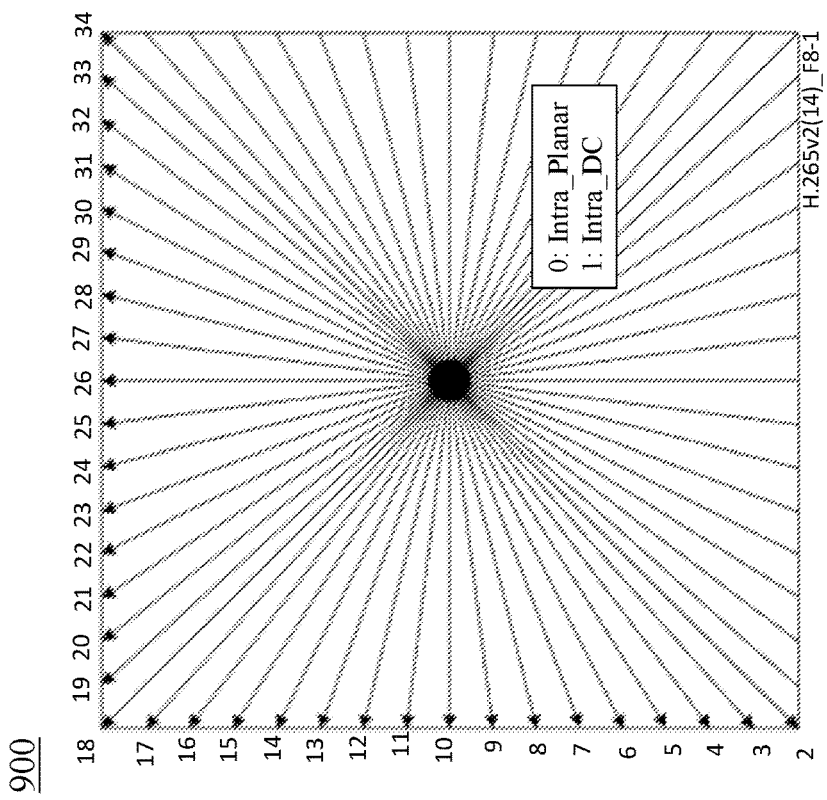
FIG. 9A is a simplified illustration of a diagram in accordance with embodiments.

FIG. 9A illustrates intra prediction modes 900 used in HEVC. In HEVC, there are total 35 intra prediction modes, among which mode 10 is horizontal mode, mode 26 is vertical mode, and mode 2, mode 18 and mode 34 are diagonal modes. The intra prediction modes are signaled by three most probable modes (MPMs) and 32 remaining modes.

FIG. 9B illustrates, in embodiments of VVC, there are total 87 intra prediction modes where mode 18 is horizontal mode, mode 50 is vertical mode, and mode 2, mode 34 and mode 66 are diagonal modes. Modes −1~−10 and Modes 67~76 are called Wide-Angle Intra Prediction (WAIP) modes.

The prediction sample pred(x,y) located at position (x, y) is predicted using an intra prediction mode (DC, planar, angular) and a linear combination of reference samples according to the PDPC expression:

$$\text{pred}(x,y)=(wL\times R-1,y+wT\times Rx,-1-wTL\times R-1,-1+(64-wL-wT+wTL)\times\text{pred}(x,y)+32)>>6$$

where Rx,−1, R−1,y represent the reference samples located at the top and left of current sample (x, y), respectively, and R−1,−1 represents the reference sample located at the top-left corner of the current block.

For the DC mode the weights are calculated as follows for a block with dimensions width and height:

$$wT=32>>((y<<1)>>\text{nScale}), wL=32>>((x<<1)>>\text{nScale}), wTL=(wL>>4)+(wT>>4),$$

with nScale=(log 2(width)−2+log 2(height)−2+2)>>2, where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor.

For planar mode wTL=0, while for horizontal mode wTL=wT and for vertical mode wTL=wL. The PDPC weights can be calculated with adds and shifts only. The value of pred(x,y) can be computed in a single step using Eq. 1.

Herein the proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. According to embodiments, the term block may be interpreted as a prediction block, a coding block, or a coding unit, i.e. CU.

Figure 10:
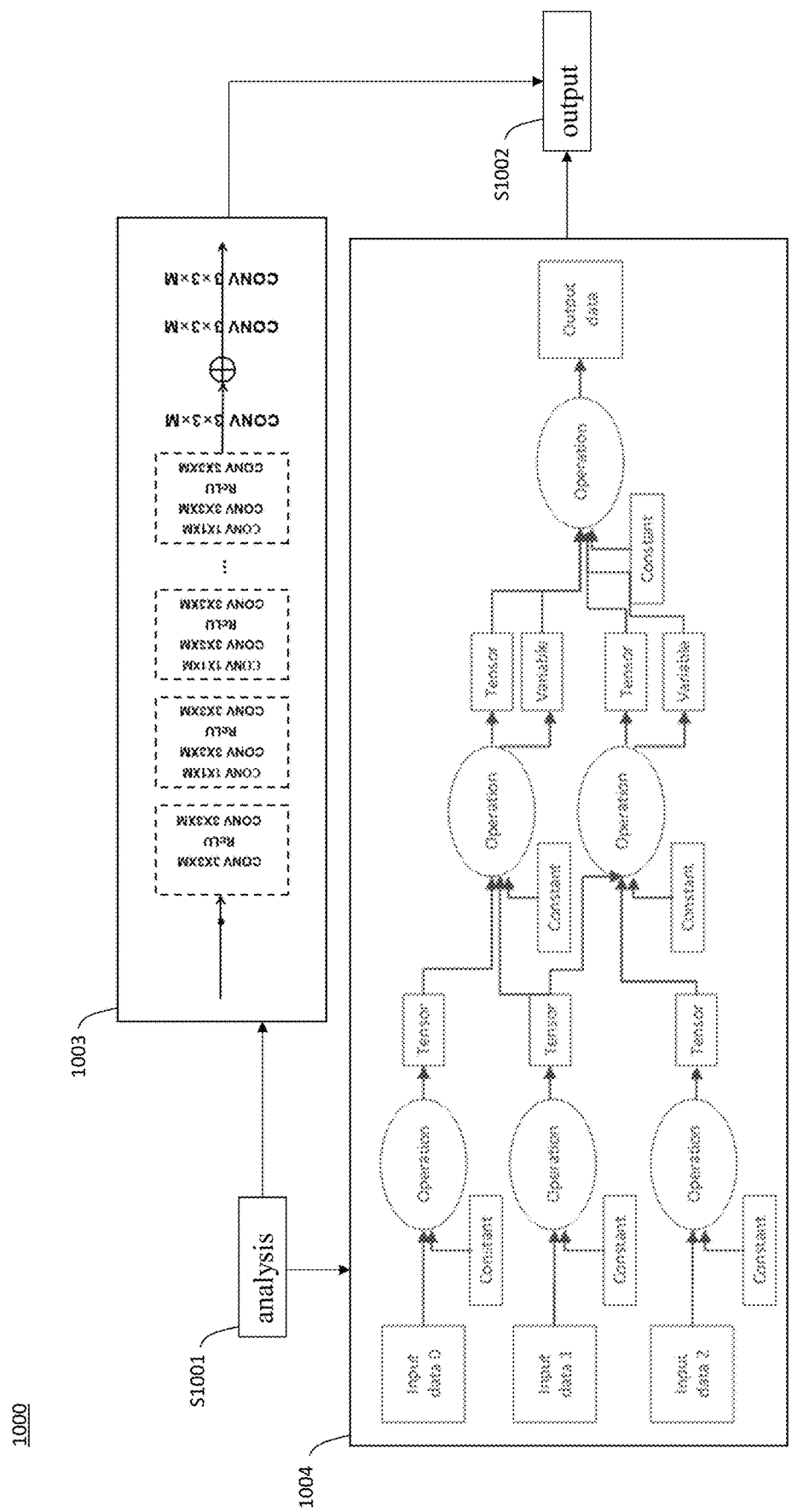
FIG. 10 is a simplified illustration of a diagram in accordance with embodiments.

FIG. 10 illustrates an exemplary diagram 1000 in which there is an analysis step S1001 that may involve analyzing any one or more of a network structure 1003 and a computational graph or other representation of some convolutional neural network 1003 and providing an output step S1002 as will be described further below.

In the context of neural network based coding, network structure 1003 may, in VVC and AVS3 for example, involve various neural network based methods, especially a neural network based filter for example. Network structure 1003 represents a neural network based filter including several convolutional layers, as an example, the kernel size is 3*3*M, which means for each channel, the convolutional kernel size is 3*3, and the output layer number is M. As in network structure 1003, combining a convolutional layer and a non-linear activation function (e.g., ReLU) may allow the whole process to be seen as a non-linear filter for the reconstruction, and, after the filtering process, the quality can be improved. The illustrated network structure 1002 may be, according to embodiments, a simplified block illustration, and considering the complexity of neural network based coding methods, a normal codec may not be able to do the filtering process; thus several identifiers in SEI may be added for indicating whether the current CVS uses neural network based tools or not according to exemplary embodiments herein. Besides, the network details may also be indicated. And as such, if a decoder could not process the neural network based filter, the information related to neural network could be discarded, and the process could be otherwise skipped.

As discussed further below, exemplary embodiments provide at least two mechanisms in terms of signaling neural network model information. A first one is signaling explicitly one or more topology information as well as the corresponding parameters trained with specific syntax elements defined in VSEI, and another one is providing an external linkage information which indicates where the corresponding topology information and network parameters are present.

For signaling network topologies and parameters, referencing the existing formats that have been developed for representation of network may be employed according to exemplary embodiments, and an example thereof may involve a Neural Network Exchange Format (NNEF) that is a generalized neural network exchanging format developed by Khronos. Other possible examples include embodiments such as involving Open Neural Network Exchange (ONNX) and MPEG NNR, which is a format for coded representation of neural network.

Ideally, any neural network models can be exported to NNEF and other formats, and network accelerator and libraries can consume data in the formats without compatibility issue with any network framework. As a practical method, embodiments may directly reference outside files or bitstream with URI information. However, it is also desired to have a lightweight syntax design to represent video coding specific network for VVC or HEVC-extension with novel neural-network based video coding tools, because a generic representation of network model may be bulky to be used for the compressed video format. Since mostly used network models for video compression are based on convolutional neural network (CNN), having a compact representation of CNN in SEI message is expected to be helpful to reduce the total bitrate as well as to enable easy access to the network model data according to exemplary embodiments.

Embodiments herein may represent, a neural network model can be represented by a computational graph, which is a directed graph with multiple nodes, such as with the illustrated convolutional neural network 1003 wherein nodes may consist of operation nodes and data, such as tensor. According to exemplary embodiments, various network topologies are designed and used; however, for post-/in-loop filtering for video processing, CNN-based simple models are may be adopted. In such case, a simple multi-layered feedforward network like CNN can be represented by a linear graph that starts from the input data, where each operation node in a layer produces an intermediately processed data. Finally, the output data may be generated through multiple layers and representations thereof may be output at S1002.

For example, the convolutional neural network 1003 is illustrated an example of linear computational graph for CNN such that when input tensor data are fed into an operation node, the operation node processes the input data with and the pretrained constants and/or variables and outputs the intermediate tensor data. When the operation nodes are executed, actual data is consumed by operation node. Usually for CNN, the weighted summation of input data with trained constants and/or updated variables is the output of each operation node.

In terms of specification of such network graph, once a specific operation node is specified as a single step, the same operation node can be used iteratively. As such, embodiments herein advantageously represent descriptions of network topologies by syntax elements in SEI message at S1002. In cases in which more complicated model designs may be required, external formats like NNEF or ONNX can be used at S1002.

For delivering network parameters, usually the bit size of trained network parameters is too huge to be contained in an SEI message. To reduce the data size, MPEG-NNR format can be used for compressing parameters and can be partitioned into multiple data chunk at S1002. Each chunk of compressed parameters can be contained in an SEI message or a separate data file, which is potentially delivered in the same bitstream or stored in a remote server. When decoded, all concatenated chunk data in SEI messages for representation of neural network may be spliced and consumed by neural network library or decoders according to exemplary embodiments.

Such embodiments with respect to FIG. 10 are described further below with at least FIGS. 11-18.

Figure 11:
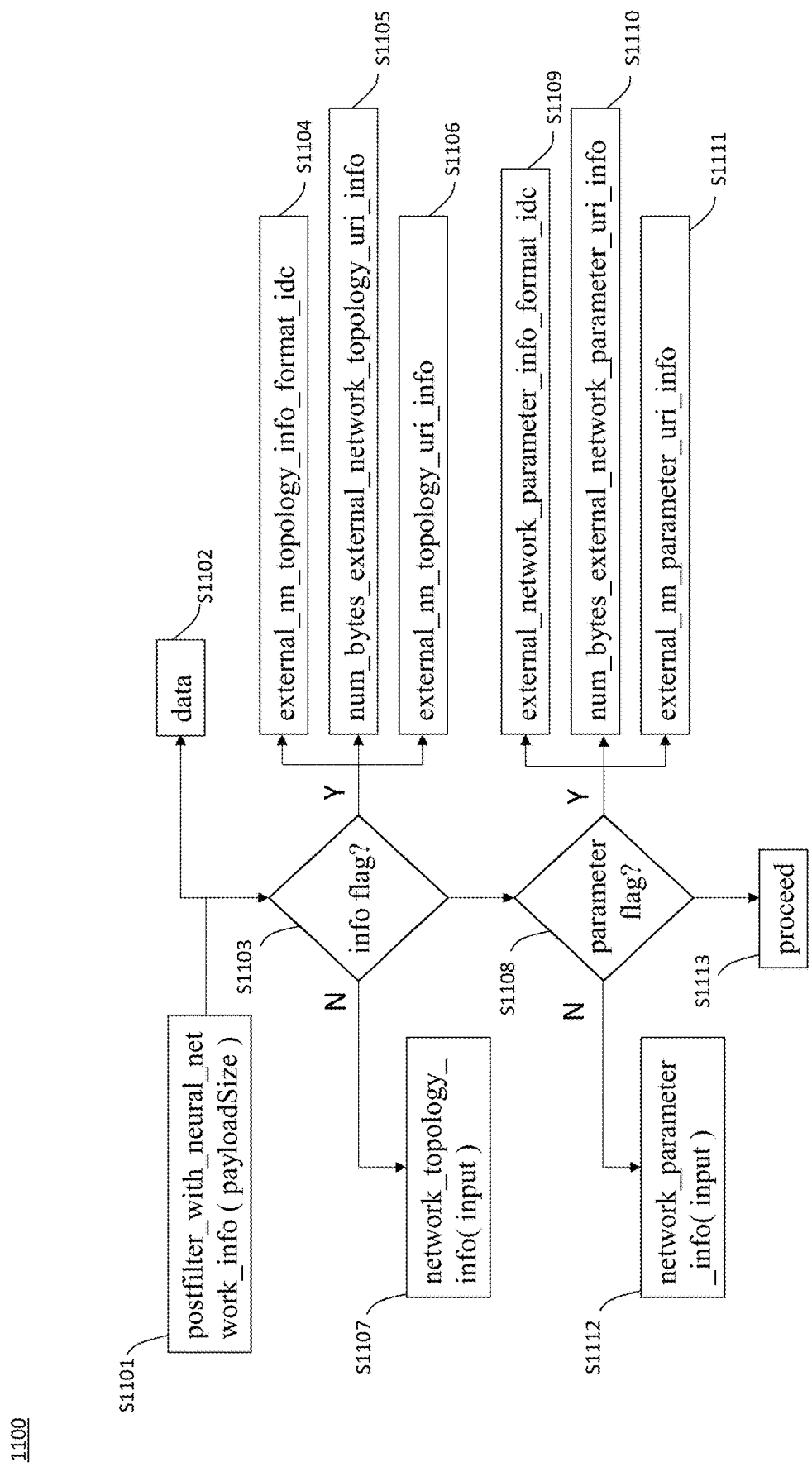
FIG. 11 is a simplified illustration of a flow chart in accordance with embodiments.

For example, embodiments herein involve generation and use of an SEI message for carriange of post-filtering neural network (NN) information. FIG. 11 represents an exemplary flowchart 1100 regarding aspects of an NN based post-filtering message and syntax thereof.

Such syntax may be represented below in Table 1:

TABLE 1

|  | Descriptor |
| --- | --- |
| postfilter_with_neural_network_info ( payloadSize ) { |  |
|   nn_partition_flag | u(1) |
|   nn_topology_info_external_present_flag | u(1) |
|   nn_parameter_info_external_present_flag | u(1) |
|   nn_input_pic_format_present_flag | u(1) |
|   nn_output_pic_format_present_flag | u(1) |
|   nn_postfilter_type_idc | u(3) |
|   num_nn_input_ref_pic | ue(v) |
|   if( nn_partition_flag ) { |  |
|     num_partitioned_nn_sei_messages | ue(v) |
|     nn_sei_message_idx | ue(v) |
|   } |  |
|   if( network_topology_info_external_present_flag ) { |  |
|     external_nn_topology_info_format_idc | u(4) |
|     num_bytes_external_nn_topology_uri_info | ue(v) |
|     external_nn_topology_uri_info | u(v) |
|   } |  |
|   else { |  |
|     network_topology_info( input ) |  |
|   } |  |

TABLE 1-continued

| | Descriptor |
|---|---|
| if( network_parameter_info_external_present_flag ) { | |
|    external_network_parameter_info_format_idc | u(4) |
|    num_bytes_external_network_parameter_uri_info | ue(v) |
|    external_network_parameter_uri_info | u(v) |
| } | |
| else { | |
|    network_parameter_info( input ) | |
| } | |
| if( network _input_pic_format_present_flag ) { | |
|    nn_input_chroma_format_idc | u(2) |
|    nn_input_bitdepth_minus8 | ue(v) |
|    nn_input_pic_width | ue(v) |
|    nn_input_pic_height | ue(v) |
|    nn_patch_size_present_flag | u(1) |
|    if( nn_patch_size_present_flag ) { | |
|      nn_input_patch_width | ue(v) |
|      nn_input_patch_height | ue(v) |
|      nn_boundary_padding_idc | u(2) |
|    } | |
| } | |
| if( num_network_input_ref_pic > 0 ) { | |
|    num_fwd_ref_pics_as_input | u(4) |
|    if ( NumFwdRefPics > 0 ) { | |
|      nearest_fwd_ref_pics_used_flag | u(1) |
|      for( i = 0; i < NumFwdRefPics && | |
| !nearest_fwd_ref_pics_used_flag; i++ ) { | |
|        poc_dist_fwd_ref_pic[ i ] | ue(v) |
|      } | |
|    } | |
|    if ( NumBwdRefPics > 0 ) { | |
|      nearest_bwd_ref_pics_used_flag | u(1) |
|      for( i = 0; i < NumBwdRefPics && | |
| !nearest_bwd_ref_pics_used_flag; i++ ) { | |
|        poc_dist_bwd_ref_pic[ i ] | u(6) |
|      } | |
|    } | |
| } | |
| } | |

An nn_partition_flag equal to 0 specifies that all data to represent the network topology and the trained parameters are included in an SOI message, and an nn_partition_flag equal to 1 specifies that the data to represent the network topology and the trained parameters are partitioned into multiple SEI messages.

An nn_output_pic_format_present_flag equal to 0 specifies that the syntax elements indicating the output picture format are not present in the SEI message and the output picture format of the neural network inference process is identical to the output picture format of decoder, and an nn_output_pic_format_present_flag equal to 1 specifies that the syntax elements indicating the output picture format are present in the SEI message.

An nn_postfilter_type_idc specifies the post-filter type of the neural network represented by the SEI message, as specified by the below table 2 (NN post filter type):

TABLE 2

| nn_postfilter_type_idc | Post filtering type |
|---|---|
| 0 | Visual quality improvement with single input picture |
| 1 | Visual quality improvement with multiple input pictures |
| 2 | Super resolution with single input picture |
| 3 | Super resolution with multiple input pictures |
| 4 . . . 15 | Reserved |

The num_nn_input_ref_pic specifies the number of input reference pictures. num_nn_input_ref_pic equal to 0 specifies that the current output picture of decoder is the only input data of the neural network, and an num_nn_input_ref_pic greater than 0 specifies that the number of reference pictures, which are used as input data of the neural network, is num_nn_input_ref_pic−1.

The num_partitioned_nn_sei_messages specifies the number of neural network based post-filtering SEI messages to represent the entire neural network topology with the corresponding parameters, and when not present, the value of num_partitioned_nn_sei_messages is inferred to be equal to 1.

The nn_sei_message_idx specifies the index of the partial neural network data carried in SEI message, and when not present, the value of nn_sei_message_idx is inferred to be equal to 0.

In view of that syntax noted above, the flowchart 1100 represents, at S1101 there may be an initialization of a postfilter and generation or obtaining of data S1102 such that at S1103 there may then be determined whether there is an info flag such as network_topology_info_external_present_flag such that, if so, there may be obtained data including external_nn_topology_info_format_idc at S1104, num_bytes_external_network_topology_uri_info at S1105, external_nn_topology_uri_info at S1106 or otherwise a check to receive a network_topology_info(input) at S1107.

That is, according to exemplary embodiments, an nn_topology_info_external_present_flag equal to 0 specifies that the data of neural network topology representation is contained in the SEI message, whereas an nn_topology_info_external_present_flag equal to 1 specifies that the data of neural network topology representation may be externally present and the SEI message contains the external linkage information only.

The external_nn_topology_info_format_idc such as at S1104 may specify the external storage format of the neural network topology representation, as specified by the below table 3 (external NN topology information format identifier):

TABLE 3

| external_nn_topology_info_format_idc | Storage format |
|---|---|
| 0 | Unrecognized storage format |
| 1 | NNEF |
| 2 | ONNX |
| 3 . . . 15 | Reserved |

The num_bytes_external_network_topology_uri_info such as at S1105 specifies the number of bytes of the syntax element external_network_topology_uri_info.

The external_nn_topology_uri_info such as at S1106 specifies the URI information of the external neural network topology information. The length of the syntax element may be Ceil(Log 2(num_bytes_external_nn_topology_uri_info) bytes.

The network_topology_info (input) such as at S1107 may involve processes according to the following Table 4:

TABLE 4

| | Descriptor |
|---|---|
| network topology info ( input ) { | |
|    nn_topology_storage_format_idc | u(4) |
|    nn_topology_compression_format_idc | u(4) |
|    num_bytes_topology_data | ue(v) |
|    if( nn_topology_format_idc > 0 ) { | |
|      for( I = 0; I < num_bytes_topology_data; i++ ) { | |
|        nn_topology_data_byte[ I ] | b(8) |
|      } | |
|    } | |
| } | |

TABLE 4-continued

| | Descriptor |
|---|---|
| else {<br>// The following syntax elements are hypothetical examples to show how CNN can be desribed<br>    num_variables<br>    for( i = 0; i < num_variables; i++ )<br>        define_variable( i )<br>    num_operation_nodes_types<br>    for( i = 0; i < num_operation_nodes_types; i++ )<br>        define_operation_node( i )<br>    num_operation_node_executions<br>    for( i = 0; i < num_operation_node_executions; i++ )<br>        operation_node_excution( i )<br>    }<br>} | <br><br><br>ue(v)<br><br><br>ue(v)<br><br><br>ue(v)<br> |

Figure 14:
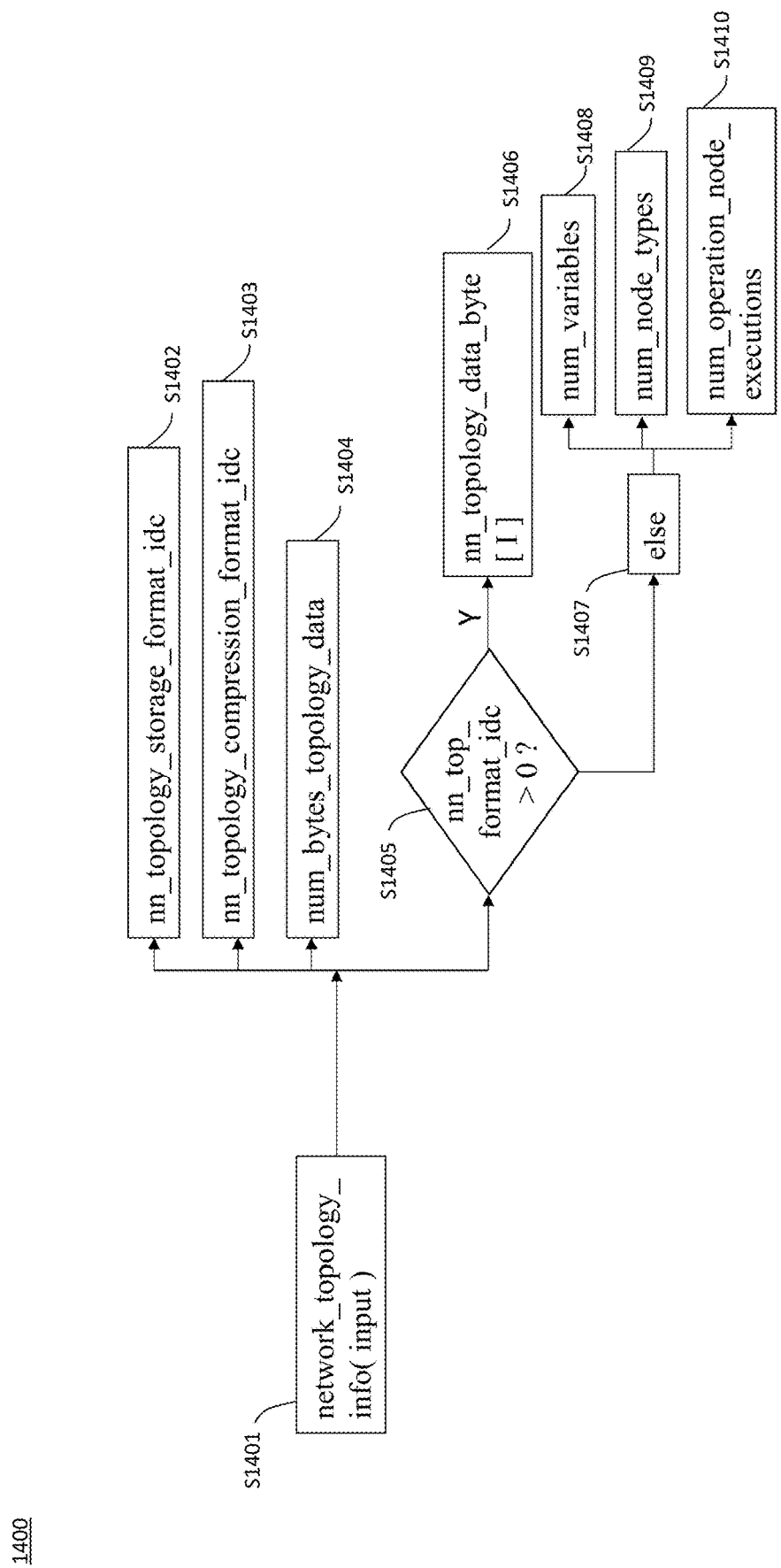
FIG. 14 is a simplified illustration of a flow chart in accordance with embodiments.

For example, see the exemplary flowchart 1400 of FIG. 14 in which there is, at S1401 a determination, as with S1007, that there is to be processing according to a network_topology_info(input) which may proceed to one or more of generating or obtaining an nn_topology_storage_format_idc at S1402, a nn_topology_compression_format_idc at S1403, a num_bytes_topology_data at S1404, and a determination as to whether there is a nn_top_format_idc>0 ? at S1405. If at S1405 there is determined yes, then at S1406 there is obtained an nn_topology_data_byte[I] at S1406.

The nn_topology_storage_format_idc such as at S1402 specifies the storage format of the neural network topology representation, as specified by the below table 5 (NN topology storage format identifiers):

TABLE 5

| nn_parameter_storage_format | Storage format |
|---|---|
| 0 | Unrecognized storage format |
| 1 | NNEF |
| 2 | ONNX |
| 3 . . . 15 | Reserved |

The nn_topology_compression_format_idc such as at S1403 specifies the compression format of the neural network topology, as specified by the below table 6 (NN topology compression format identifier):

TABLE 6

| nn_topology_compression_format_idc | Compression format |
|---|---|
| 0 | Uncompressed |
| 1 | ZLIB compressed data format |
| 2 . . . 15 | Reserved |

The num_bytes_topology_data such as at S1404 specifies the number of bytes of the neural network topology payload that is contained in this SEI message.

The nn_topology_data_byte[I] such as at S1406 specifies the i-th byte of neural network topology payload.

The num_variables such as at S1408 specifies the number of variables that may be used for the execution of operation nodes in the neural network specified by this SEI message.

The num_node_types such as at S1409 specify the number of operation node types that may be used for the execution of operation nodes in the neural network specified by this SEI message The num_operation_node_executions such as at S1410 specify the number of operation node executions with the input variables by the neural network specified by this SEI message.

Returning to the flowchart 1110 of FIG. 11, at S1108, it may be determined whether there is present an network_parameter_info_external_present_flag and if so, there may be generated or obtained an external_network_parameter_info_format_idc at S1109, a num_bytes_external_network_parameter_uri_info at S1110, and an external_nn_parameter_uri_info at S1111; otherwise, at S1112, there may be obtained or generated a network_parameter_info(input).

The network_parameter_info_external_present_flag such as at S1108 equal to 0 specifies that the data of neural network parameters is constrained in the SEI message, and such network_parameter_info_external_present_flag equal to 1 specifies that the data of neural network parameters may be externally present and the SEI message contains the external linkage information only.

The external_network_parameter_info_format_idc at S1109 specifies the external storage format of the neural network parameters, as specified by the below table 7 (external neural network parameter storage format identifier):

TABLE 7

| external_network_parameter_info_format_idc | Storage format |
|---|---|
| 0 | Unrecognized storage format |
| 1 | NNEF |
| 2 | ONNX |
| 3 | MPEG-NNR |
| 4 . . . 15 | Reserved |

The num_bytes_external_network_parameter_uri_info at S1110 specifies the number of bytes of the syntax element external_network_parameter_uri_info.

The external_nn_parameter_uri_info at S1111 specifies the URI information of the external neural network parameters. The length of the syntax element is Ceil(Log 2(num_bytes_external_network_parameteruri_info)) bytes.

The network_parameter_info(input) such as at S1112 represents the following processes of table 8:

TABLE 8

| | Descriptor |
|---|---|
| network_parameter_info ( input ) {<br>    nn_parameter_type_idc<br>    nn_parameter_storage_format_idc<br>    nn_parameter_compression_format_idc<br>    num_bytes_parameter_data<br>    for( I = 0; I < num_bytes_topology_data; i++ ) {<br>        nn_parameter_data_byte[ I ]<br>    }<br>    ...<br>} | <br>u(4)<br>u(4)<br>u(4)<br>ue(v)<br><br>b(8)<br> |

Figure 17:
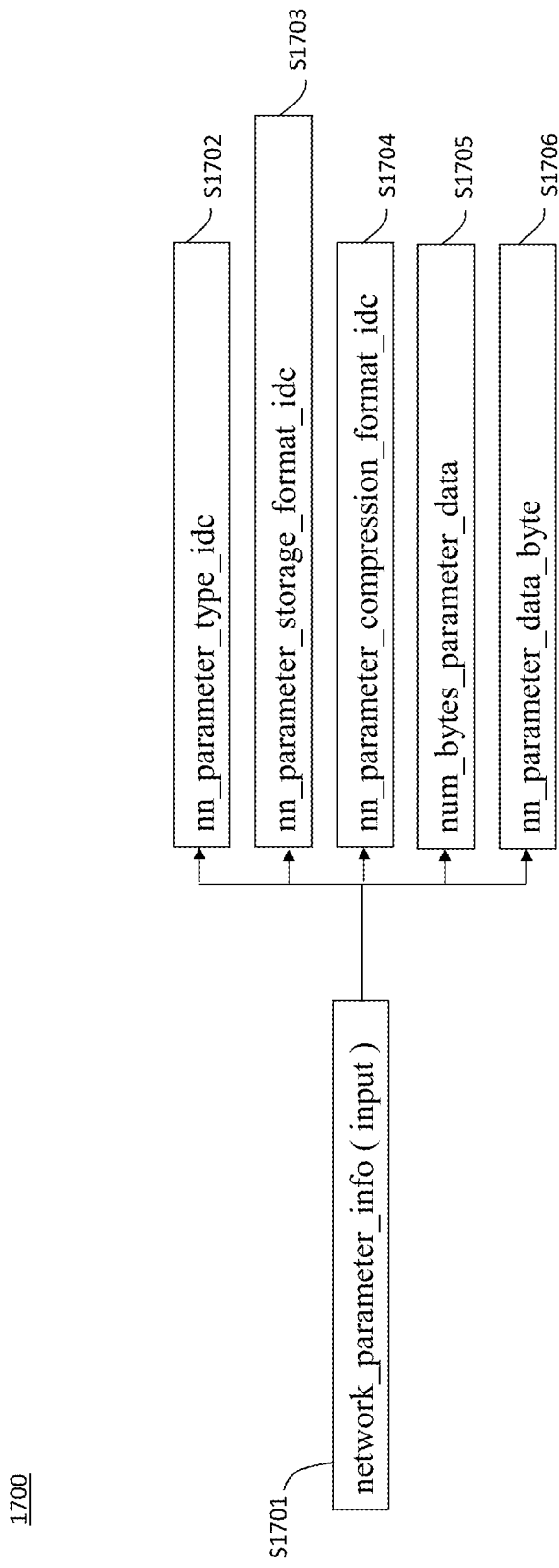
FIG. 17 is a simplified illustration of a flow chart in accordance with embodiments.

As in the flowchart 1700 in FIG. 17, determining the network_parameter_info (input) as at S1701, which represents also S1112 in FIG. 11, involves obtaining or otherwise generating an nn_parameter_type_idc at S1702, an nn_parameter_storage_format_idc at S1703, an nn_parameter_compression_format_idc at S1704, an num_bytes_parameter_data at S1705, and an nn_parameter_data_byte at S1706.

The nn_parameter_type_idc such as at S1702 specifies the data payload type of the neural network parameters, as specified by the below table 9 (NN parameter payload types):

TABLE 9

| nn_parameter_type_idc | Parameter type |
| --- | --- |
| 0 | Integer |
| 1 | Float |
| 2 . . . 15 | Reserved |

The nn_parameter_storage_format_idc such as at S1703 specifies the storage format of the neural network parameters, as specified by the below table 10 (NN parameter storage format identifier):

TABLE 10

| nn_parameter_storage_format_idc | Storage format |
| --- | --- |
| 0 | Unrecognized storage format |
| 1 | NNEF |
| 2 | ONNX |
| 3 | MPEG-NNR |
| 4 . . . 15 | Reserved |

The nn_parameter_compression_format_idc such as at S1704 specifies the compression format of the neural network parameters, as specified by the below table 11 (NN topology compression format identifier):

TABLE 11

| topology_compression_format_idc | Compression format |
| --- | --- |
| 0 | Uncompressed |
| 1 | ZLIB compressed data format |
| 2 . . . 15 | Reserved |

The num_bytes_parameter_data such as at S1705 specifies the number of bytes of the neural network parameter payload that is contained in this SEI message.

The nn_parameter_data_byte such as at S1706 specifies the i-th byte of neural network parameter payload.

Figure 12:
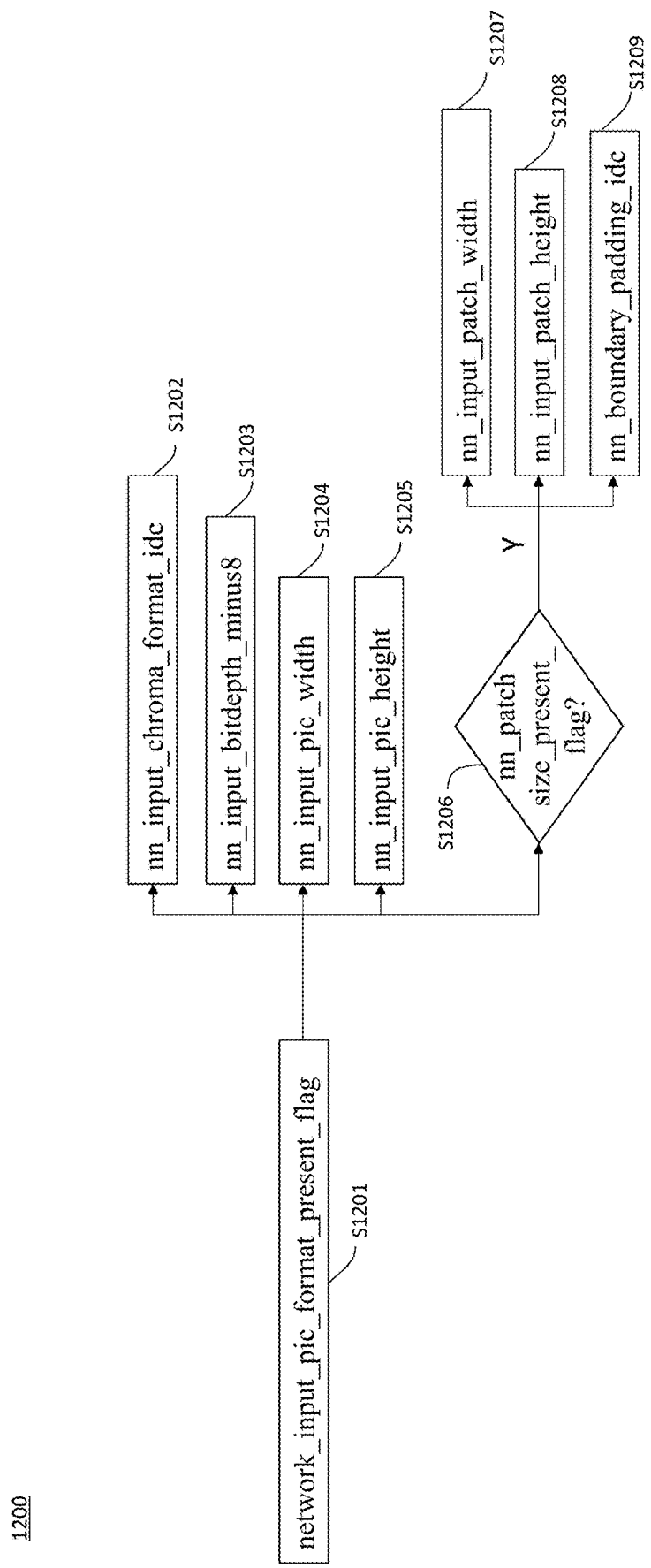
FIG. 12 is a simplified illustration of a flow chart in accordance with embodiments.

Returning to FIG. 11, at S1113, the process may proceed such as to S1201 of flowchart 1200 of FIG. 12 in which it may be determined whether there is present an network_input_pic_format_present_flag, When present, at there may be generation of or obtaining of an nn_input_chroma_format_idc at S1202, an nn_input_bitdepth_minus8 at S1203, an nn_input_pic_width 1204, an nn_input_pic_height S1205, and a determination at S1206 as to whether there is present an nn_patch_size_present_flag and if so at there is obtaining or generating of an nn_input_patch_width at S1207, an nn_input_patch_height at S1208, and an nn_boundary_padding_idc at S1209.

An network_input_pic_format_present_flag such as at S1201 equal to 0 specifies that the syntax elements indicating the input picture format are not present in the SEI message and the input picture format of the neural network inference process is identical to the output picture format of decoder. nn_input_pic_format_present_flag equal to 1 specifies that the syntax elements indicating the input picture format are present in the SEI message The nn_input_chroma_format_idc at S1202 may specify the chroma sampling relative to the luma sampling according to the following table 12 (chroma format identifier):

TABLE 12

| nn_input_chroma_format_idc | Chroma format |
| --- | --- |
| 0 | Monochrome |
| 1 | 4:2:0 |
| 2 | 4:2:2 |
| 3 | 4:4:4 |

The nn_input_bitdepth_minus8 such as at S1203 (or plus 8) specifies the bit depth of the luma and chroma samples in the input picture of neural network.

The nn_input_pic_width such as at 1204 specifies the width of the input picture.

The nn_input_pic_height such as at S1205 specifies the height of the input picture.

The nn_patch_size_present_flag such as at S1206 equal to 0 specifies that the patch size is equal to the input picture size. nn_patch_size_present_flag equal to 1 specifies that the patch size is explicitly signaled.

The an nn_input_patch_width such as at S1207 specifies the width of patch for neural network inference process.

The nn_input_patch_height such as at S1208 specifies the height of patch for neural network inference process.

The nn_boundary_padding_idc such as at S1209 specifies the padding method applied to the boundary of patch, when the patch size is different from the input picture size such as according to the following table 13 (boundary padding identifier):

TABLE 13

| nn_boundary_padding_idc | Padding type |
| --- | --- |
| 0 | Nearest neighbor copy |
| 1 . . . 3 | Reserved |

Figure 13:
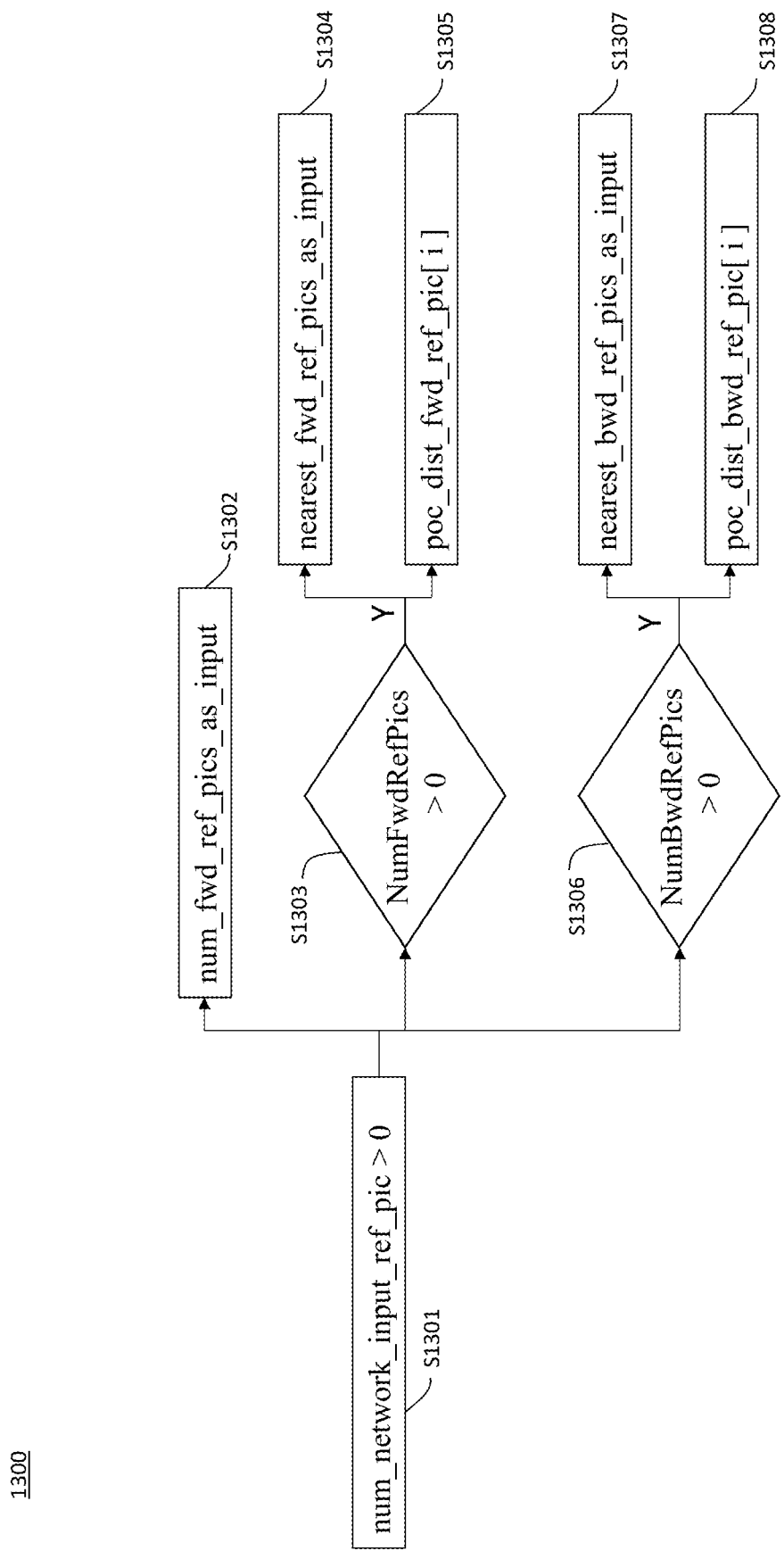
FIG. 13 is a simplified illustration of a flowchart in accordance with embodiments.

Returning to FIG. 11, at S1113, the process may also proceed in parallel or in series to the flowchart 1200 of FIG. 12 at the flowchart 1300 of FIG. 13 in which it may be determined whether there is present an num_network_input_ref_pic>0 at S1301. If so, there may be an obtaining or a generation of num_fwd_ref_pics_as_input at S1302, a determination as to whether there is an indication of NumFwdRefPics>0 at S1303, and a determination as to whether there is an indication of NumBwdRefPics>0 at S1306. Further, if so at S1303, then there may be a determination as to a nearest_fwd_ref_pics_as_input at S1304 and a poc_dist_fwd_ref_pic[i] at S1305. Further, if so at S1303, then there may be a determination as to a nearest_bwd_ref_pics_as_input at S1307 and a poc_dist_bwd_ref_pic[i] at S1308.

The num_fwd_ref_pics_as_input such as at S1302 specifies the number of forward reference pictures that are used as input data of neural network that that, for example if (num_nn_input_ref_pic>0) then (NumFwdRefPics=num_fwd_ref_pics_as_input) else (NumFwdReftPics=0)

The nearest_fwd_ref_pics_as_input such as at S1304 specifies the nearest forward reference pictures, which have the smallest picture order count distance from the current picture, are used as input data of the neural network.

The poc_dist_fwd_ref_pic[i]such as at S1305 specifies the picture order count value of the i-th forward reference picture that is used as input data of the neural network. The picture order count value of the i-th forward refer picture is equal to the picture order count value of the current picture minus poc_dist_fwd_ref_pic[i].

The nearest_bwd_ref_pics_as_input such as at S1307 specifies the number of backward reference pictures that are used as input data of neural network such that if (num_n-n_input_ref_pic>0) then (NumBwdRefPics=num_bwd_ref_pics_as_input) else (NumBwdRefPics=0).

The poc_dist_bwd_ref_pic[i] such as at S1308 specifies the picture order count value of the i-th backward refer picture that is used as input data of the nueral network. The picture order count value of the i-th backward refer picture is equal to the picture order count value of the current picture plus poc_dist_bwd_ref_pic[i].

Also, as a note the nearest_bwd_ref_pics_used_flag, such as in the above Table 1, specifies the nearest backward reference pictures, which have the smallest picture order count distance from the current picture, are used as input data of the neural network.

Figure 15:
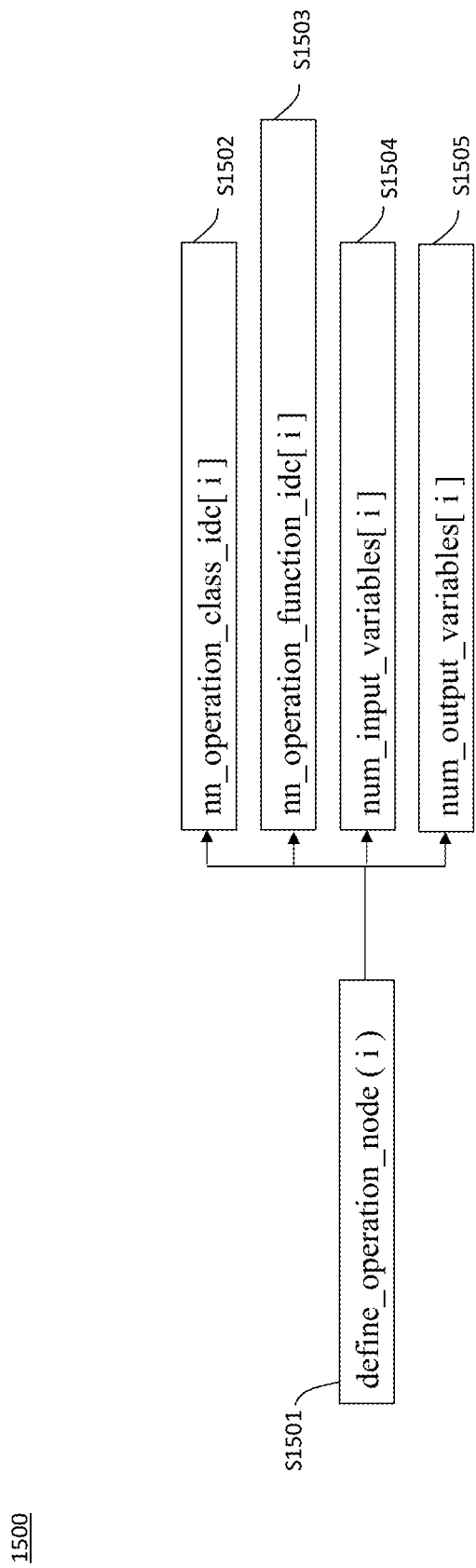
FIG. 15 is a simplified illustration of a flow chart in accordance with embodiments.

Additional operations may be implemented such as with the flowchart 1500 of FIG. 15 in which there is a define_operation_node (i) at S1501 in which there will be operations of iteratively defining an nn_operation_class_idc[i] at S1502, and nn_operation_function_idc[i] at S1503, an num_input_variables[i] at S1504, and a num_output_variables[i] at S1505.

The nn_operation_class_idc[i] such as at S1502 specifies the class of the i-th operation node, as specified by the below table 14 (NN operation function):

TABLE 14

| nn_operation_class_idc | Operation class |
| --- | --- |
| 1 | Convolution/deconvolution |
| 2 | Filtering |
| 3 | Up and Down sampling |
| 4 | Pooling |
| 5 | Element-wise operation |
| 6 | Reshaping |
| 7 | Activation |
| 8 | Quantization |
| 9 . . . 255 | Reserved |

The nn_operation_function_idc[i] such as at S1503 specifies the function of the i-th operation node, as specified by the below table 15 (NN operation function, the example table 15 of nn_operation_class_idc equal to 7 (activation function)):

TABLE 15

| nn_operation_function_idc (nn_operation_class_idc equal to 7) | Function |
| --- | --- |
| 1 | Sigmoid |
| 2 | Relu |
| 3 | Leaky_relu |
| 4 | Tanh |
| 5 | Softmax |
| 6 . . . 255 | Reserved |

The num_input_variables[i] such as at S1504 specifies the number of input variables of the i-th operation node.

The num_output_variables[i] such as at S1505 specifies the number of output variables of the i-th operation node.

Syntax with respect to FIG. 15 may be represented by the following table 16:

TABLE 16

| | Descriptor |
| --- | --- |
| operation_node_execution ( i ) { | |
|   nn_op_node_idx[ i ] | u(v) |
|   for( j = 0; j < num_input_variables[ nn_op_node_idx[ i ] ]; j++ ) { | |
|     nn_input_variable_idx[ i ][ j ] | u(v) |
|   } | |
|   for( j = 0; j < num_output_variables[ nn_op_node_idx[ i ] ]; j++ ) { | |
|     nn_output_variable_idx[ i ][ j ] | u(v) |
|   } | |
|   ... | |
| } | |

Figure 16:
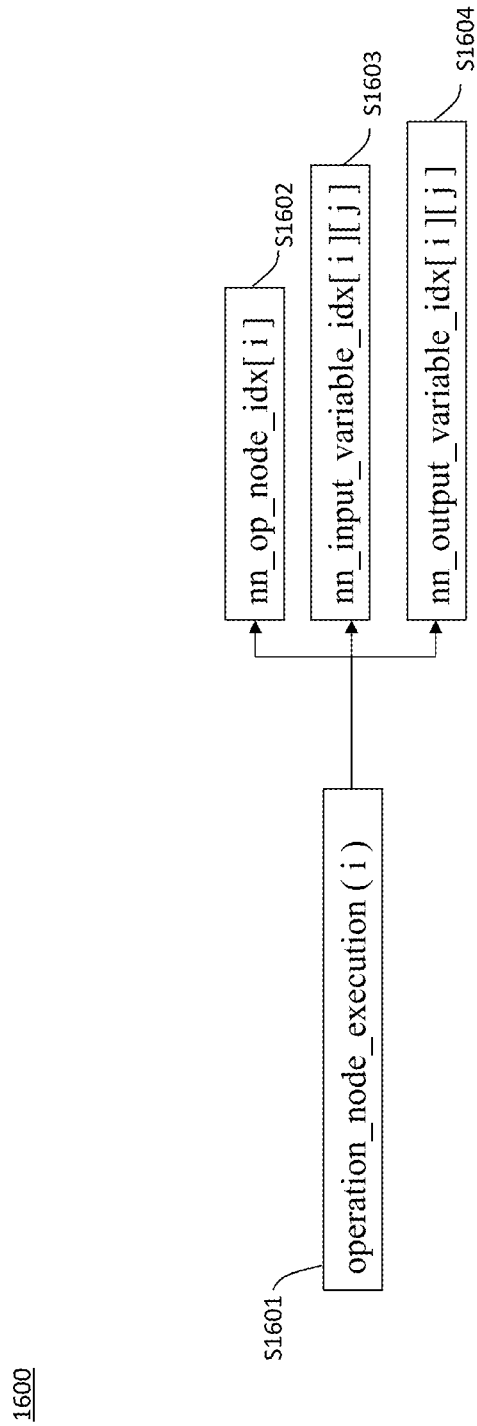
FIG. 16 is a simplified illustration of a flow chart in accordance with embodiments.

Additional operations may be implemented such as with the flowchart 1600 of FIG. 16 in which there is an operation_node_execution (i) at S1601 in which there will be operations of iteratively defining an nn_op_node_idx[i] at S1602, and nn_input_variable_idx[i][j] at S1603, an nn_output_variable_idx[i][j] at S1604.

The nn_op_node_idx[i] such as at S1602 specifies the index of the operation node for the i-th operation node execution. The nn_op_node_idx[i]-th operation node is used for this execution.

The nn_input_variable_idx[i][j] such as at S1603 specifies the variable index of the j-th input variable of the i-th operation node execution.

The nn_output_variable_idx[i][j] such as at S1604 specifies the variable index of the j-th output variable of the i-th operation node execution.

Syntax with respect to FIG. 16 may be represented by the following table 17:

TABLE 17

| | Descriptor |
| --- | --- |
| define_operation_node ( i ) { | |
|   nn_operatoin_class_idc[ i ] | u(8) |
|   nn_operation_function_idc[ i ] | u(8) |
|   num_input_variables[ i ] | ue(v) |
|   num_output_variables[ i ] | ue(v) |
|   ... | |
| } | |

Additional processes may involve iteratively defining, such as with FIG. 15, a variable(i) such as according to the following syntax of table 18:

TABLE 18

| | Descriptor |
| --- | --- |
| define_variable ( i ) { | |
|   nn_variable_class_idc[ i ] | u(4) |
|   nn_variable_type_idc [ i ] | u(4) |
|   nn_variable_dimensions[ i ] | ue(v) |
|   for( j = 0; j < num_bytes_topology_data; j++ ) { | |
|     nn_variable_dimension_size[ i ][ j ] | ue(v) |
|   } | |
|   ... | |
| } | |

Viewing Table 16, nn_variable_class_idc[i] specifies the variable class of the i-th variable in the neural network, as specified by the below table 19 (NN variable classes):

TABLE 19

| nn_variable_class_idc | Variable type |
| --- | --- |
| 0 | Unspecified |
| 1 | Input |
| 2 | Output |
| 3 | Intermediate variable |
| 4 | Kernel |
| 5 | Bias |
| 6 | Constant |
| 7 ... 15 | Reserved |

According to exemplary embodiments, it may be determined that when nn_variable_class_idc is equal to 1, the variable is the input data of the neural network; when nn_variable_class_idc is equal to 2, the variable is the output data of the neural network; when nn_variable_class_idc is equal to 3, the variable is the intermediate data between operation node; and when nn_variable_class_idc is equal to 4, the variable is the pretrained or predefined constant data.

Further viewing Table 16 the nn_variable_type_idc[I] specifies the variable type of the i-th variable in the neural network, as specified by the below table 20 (NN variable types):

TABLE 20

| nn_parameter_type_idc | Parameter type |
| --- | --- |
| 0 | Integer |
| 1 | Float |
| 2 ... 15 | Reserved |

According to exemplary embodiments, the nn_variable_dimensions[I] of Table 16 specifies the number of dimensions of the i-th variable, and further the Nn_variable_dimension_size[I][j] specifies the size of the j-th dimension of the i-th variable. As a note according to exemplary embodiments, when the i-th variable is the input data whose the number of color component, the width and the height are 3, 1920 and 1080 respectively, nn_variable_class_idc[i] is equal to 1, nn_variable_dimensions[I] is equal to 3, nn_variable_dimension_size[I][0] is equal to 3, nn_variable_dimension_size[I][1] is equal to 1920 and nn_variable_dimension_size[I][2] is equal to 1080, respectively.

The techniques described above, can be implemented as computer software using computer-readable instructions and physically stored in one or more computer-readable media or by a specifically configured one or more hardware processors. For example, FIG. 18 shows a computer system 1800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
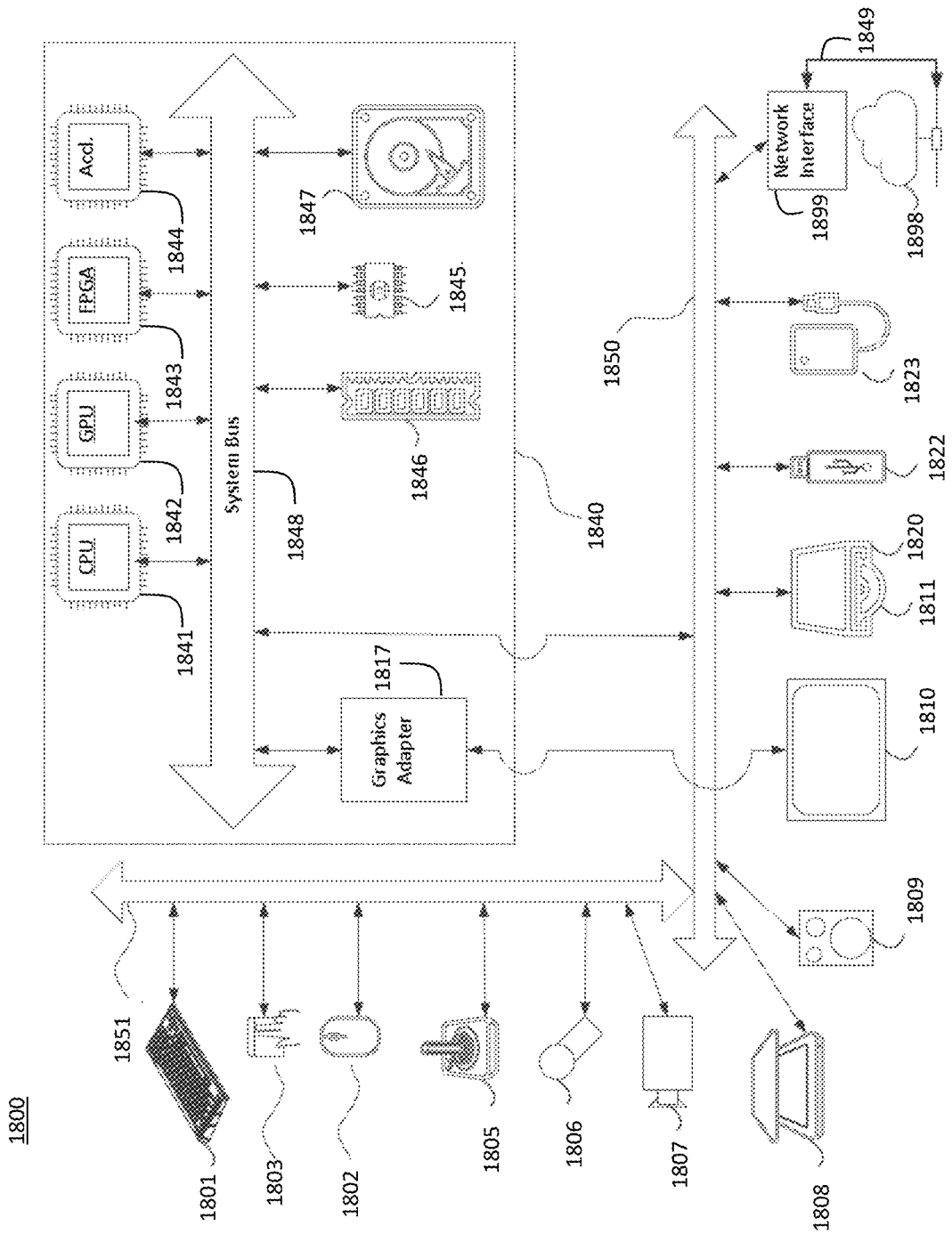
FIG. 18 is a simplified illustration of a schematic diagram in accordance with embodiments.

The components shown in FIG. 18 for computer system 1800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1800.

Computer system 1800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1801, mouse 1802, trackpad 1803, touch screen 1810, joystick 1805, microphone 1806, scanner 1808, camera 1807.

Computer system 1800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1810, or joystick 1805, but there can also be tactile feedback devices that do not serve as input devices), audio output devices (such as: speakers 1809, headphones (not depicted)), visual output devices (such as screens 1810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1800 can also include human accessible storage devices and their associated media such as optical media including CD/DVD ROM/RW 1820 with CD/DVD 2211 or the like media, thumb-drive 1822, removable hard drive or solid state drive 1823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1800 can also include interface 1899 to one or more communication networks 1898. Networks 1898 can for example be wireless, wireline, optical. Networks 1898 can further be local, wide-area, metropolitan, vehicular and industrial, real-time, delay-tolerant, and so on. Examples of networks 1898 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1898 commonly require external network interface adapters that attached to certain general-purpose data ports or peripheral buses (1850 and 1851) (such as, for example USB ports of the computer system 1800; others are commonly integrated into the core of the computer system 1800 by attachment to a system bus as described below (for example Ethernet interface into a PC computer system or cellular network interface into a smartphone computer system). Using any of these networks 1898, computer system 1800 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1840 of the computer system 1800.

The core 1840 can include one or more Central Processing Units (CPU) 1841, Graphics Processing Units (GPU) 1842, a graphics adapter 1817, specialized programmable processing units in the form of Field Programmable Gate Areas (FPGA) 1843, hardware accelerators for certain tasks 1844, and so forth. These devices, along with Read-only memory (ROM) 1845, Random-access memory 1846, internal mass storage such as internal non-user accessible hard drives, SSDs, and the like 1847, may be connected through a system bus 1848. In some computer systems, the system bus 1848 can be accessible in the form of one or more physical plugs to enable extensions by additional CPUs, GPU, and the like. The peripheral devices can be attached either directly to the core's system bus 1848, or through a peripheral bus 1851. Architectures for a peripheral bus include PCI, USB, and the like.

CPUs 1841, GPUs 1842, FPGAs 1843, and accelerators 1844 can execute certain instructions that, in combination, can make up the aforementioned computer code. That computer code can be stored in ROM 1845 or RAM 1846. Transitional data can be also be stored in RAM 1846, whereas permanent data can be stored for example, in the internal mass storage 1847. Fast storage and retrieval to any of the memory devices can be enabled through the use of cache memory, that can be closely associated with one or more CPU 1841, GPU 1842, mass storage 1847, ROM 1845, RAM 1846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1800, and specifically the core 1840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1840 that are of non-transitory nature, such as core-internal mass storage 1847 or ROM 1845. The software implementing various embodiments of the present disclosure can be stored in such devices and executed by core 1840. A computer-readable medium can include one or more memory devices or chips, according to particular needs. The software can cause the core 1840 and specifically the processors therein (including CPU, GPU, FPGA, and the like) to execute particular processes or particular parts of particular processes described herein, including defining data structures stored in RAM 1846 and modifying such data structures according to the processes defined by the software. In addition or as an alternative, the computer system can provide functionality as a result of logic hardwired or otherwise embodied in a circuit (for example: accelerator 1844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video coding performed by at least one processor, the method comprising:
   obtaining a video bitstream;
   coding the video bitstream at least partly by a neural network;
   determining topology information and parameters of the neural network; and
   signaling the determined topology information and the parameters of the neural network in a plurality of syntax elements associated with the coded video bitstream,
   wherein at least one of the plurality of syntax elements signals whether the topology information and parameters are all included in a single supplemental enhancement information (SEI) message or are partitioned into multiple SEI messages.

2. The method according to claim 1,
   wherein the plurality of syntax elements are signaled via one or more of a parameter set, a metadata container box, and at least one of the single SEI message and the multiple SEI messages.

3. The method according to claim 2,
   wherein the neural network comprises a plurality of operation nodes,
   wherein coding the video bitstream by the neural network comprises:
     feeding input tensor data of the video bitstream into a first operation node of the operation nodes;
     processing the input tensor data with any of pre-trained constants and variables; and
     outputting intermediate tensor data,
   wherein the intermediate tensor data comprises a weighted summation of the input tensor data and any of trained constants and updated variables.

4. The method according to claim 3,
   wherein the topology information and parameters are based on said coding of the video bitstream by the neural network.

5. The method according to claim 1,
   wherein signaling the determined topology information and the parameters comprises providing external linkage information at which the determined topology information and the parameters are stored.

6. The method according to claim 5,
wherein the neural network comprises a plurality of operation nodes,
wherein coding the video bitstream by the neural network comprises:
  feeding input tensor data of the video bitstream into a first operation node of the operation nodes;
  processing the input tensor data with any of pre-trained constants and variables; and
  outputting intermediate tensor data, and
wherein the intermediate tensor data comprises a weighted summation of the input tensor data and any of trained constants and updated variables.

7. The method according to claim 6,
wherein the topology information and parameters are based on said coding of the video bitstream by the neural network.

8. The method according to claim 1,
wherein signaling the determined topology information and the parameters comprises explicitly signaling the determined topology information and the parameters by at least one of a neural network exchange format (NNEF), an open neural network exchange (ONNX) format, and an MPEG neural network compression standard (NNR) format.

9. The method according to claim 8,
wherein the neural network comprises a plurality of operation nodes,
wherein coding the video bitstream by the neural network comprises:
  feeding input tensor data of the video bitstream into a first operation node of the operation nodes;
  processing the input tensor data with any of pre-trained constants and variables; and
  outputting intermediate tensor data,
wherein the intermediate tensor data comprises a weighted summation of the input tensor data and any of trained constants and updated variables, and
wherein the topology information and parameters are based on said coding of the video bitstream by the neural network.

10. The method according to claim 9,
wherein the at least one of the neural network exchange format (NNEF), the open neural network exchange (ONNX) format, and the MPEG neural network compression standard (NNR) format is the MPEG NNR format, and
wherein at least one of the parameters are compressed into a data file and at least one of the single SEI message and the multiple SEI messages.

11. An apparatus for video coding, the apparatus comprising:
at least one memory configured to store computer program code;
at least one processor configured to access the computer program code and operate as instructed by the computer program code, the computer program code including:
obtaining code configured to cause the at least one processor to obtain a video bitstream;
coding code configured to cause the at least one processor to code the video bitstream at least partly by a neural network;
determining code configured to cause the at least one processor to determine topology information and parameters of the neural network; and
signaling code configured to cause the at least one processor to signal the determined topology information and the parameters of the neural network in a plurality of syntax elements associated with the coded video bitstream,
wherein at least one of the plurality of syntax elements signals whether the topology information and parameters are all included in a single supplemental enhancement information (SEI) message or are partitioned into multiple SEI messages.

12. The apparatus according to claim 11,
wherein the plurality of syntax elements are signaled via one or more of a parameter set, a meta-data container box, and any of the SEI message and the multiple SEI messages.

13. The apparatus according to claim 12,
wherein the neural network comprises a plurality of operation nodes,
wherein coding the video bitstream by the neural network comprises:
  feeding input tensor data of the video bitstream into a first operation node of the operation nodes;
  processing the input tensor data with any of pre-trained constants and variables; and
  outputting intermediate tensor data, and
wherein the intermediate tensor data comprises a weighted summation of the input tensor data and any of trained constants and updated variables.

14. The apparatus according to claim 13,
wherein the topology information and parameters are based on said coding of the video bitstream by the neural network.

15. The apparatus according to claim 11,
wherein signaling the determined topology information and the parameters comprises providing external linkage information at which the topology information and the parameters are stored.

16. The apparatus according to claim 15,
wherein the neural network comprises a plurality of operation nodes,
wherein coding the video bitstream by the neural network comprises:
  feeding input tensor data of the video bitstream into a first operation node of the operation nodes;
  processing the input tensor data with any of pre-trained constants and variables; and
  outputting intermediate tensor data, and
wherein the intermediate tensor data comprises a weighted summation of the input tensor data and any of trained constants and updated variables.

17. The apparatus according to claim 16,
wherein the topology information and parameters are based on said coding of the video bitstream by the neural network.

18. The apparatus according to claim 11,
wherein signaling the determined topology information and the parameters comprises explicitly signaling the determined topology information and the parameters by at least one of a neural network exchange format (NNEF), an open neural network exchange (ONNX) format, and an MPEG neural network compression standard (NNR) format.

19. The apparatus according to claim 17,
wherein the neural network comprises a plurality of operation nodes,
wherein coding the video bitstream by the neural network comprises:
   feeding input tensor data of the video bitstream into a first operation node of the operation nodes;
   processing the input tensor data with any of pre-trained constants and variables; and
   outputting intermediate tensor data,
wherein the intermediate tensor data comprises a weighted summation of the input tensor data and any of trained constants and updated variables, and
wherein the topology information and parameters are based on said coding of the video bitstream by the neural network.

20. A non-transitory computer readable medium storing a program causing a computer to execute a process, the process comprising:
   obtaining a video bistream;
   coding the video bitstream at least partly by a neural network;
   determining topology information and parameters of the neural network; and
   signaling the determined topology information and the parameters of the neural network in a plurality of syntax elements associated with the coded video bitstream,
   wherein at least one of the plurality of syntax elements signals whether the topology information and parameters are all included in a single supplemental enhancement information (SEI) message or are partitioned into multiple SEI messages.

* * * * *